United States Patent
Takahashi et al.

(10) Patent No.: US 8,953,020 B2
(45) Date of Patent: Feb. 10, 2015

(54) IMAGE PROCESSING DEVICE, IMAGE PROCESSING METHOD AND PROGRAM

(75) Inventors: Nobumasa Takahashi, Kanagawa (JP); Yoshitaka Narukawa, Saitama (JP); Daisuke Kanehira, Tokyo (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 13/023,088

(22) Filed: Feb. 8, 2011

(65) Prior Publication Data

US 2011/0216166 A1 Sep. 8, 2011

(30) Foreign Application Priority Data

Mar. 3, 2010 (JP) ................................. 2010-046016

(51) Int. Cl.
H04N 13/02 (2006.01)

(52) U.S. Cl.
CPC ...................................... H04N 13/02 (2013.01)
USPC .......................................................... 348/46

(58) Field of Classification Search
USPC .......................................................... 348/46
See application file for complete search history.

(56) References Cited

U.S. PATENT DOCUMENTS

| | | | |
|---|---|---|---|
| 2004/0223049 A1* | 11/2004 | Taniguchi et al. | 348/14.02 |
| 2005/0268236 A1* | 12/2005 | Kosaka | 715/718 |
| 2007/0257902 A1* | 11/2007 | Satoh et al. | 345/419 |
| 2008/0309755 A1* | 12/2008 | Yoshida et al. | 348/51 |
| 2009/0103833 A1* | 4/2009 | Mitsuhashi et al. | 382/285 |
| 2009/0325686 A1* | 12/2009 | Davis et al. | 463/25 |

FOREIGN PATENT DOCUMENTS

| | | |
|---|---|---|
| CN | 101228799 A | 7/2008 |
| JP | 8-317425 A | 11/1996 |
| JP | 2004-320614 | 11/2004 |
| JP | 2008-005203 A | 1/2008 |
| JP | 2008-042645 A | 2/2008 |

OTHER PUBLICATIONS

Office Action issued Nov. 12, 2013 in Japanese Patent Application No. 2010-046016.
Combined Chinese Office Action and Search Report issued Apr. 23, 2014 in Patent Application No. 201110044319.0 (with English language translation).

* cited by examiner

*Primary Examiner* — Dave Czekaj
*Assistant Examiner* — Tracy Li
(74) *Attorney, Agent, or Firm* — Oblon, Spivak, McClelland, Maier & Neustadt, L.L.P.

(57) ABSTRACT

An image processing device includes an operation reception portion which receives an instruction operation for displaying a desired image from a plane image or a stereoscopic image that is stored in a recording medium; an information output portion that is connected to a display device which displays the plane image or the stereoscopic image to output image information for displaying the image stored in the recording medium on the display device; and a control portion.

14 Claims, 18 Drawing Sheets

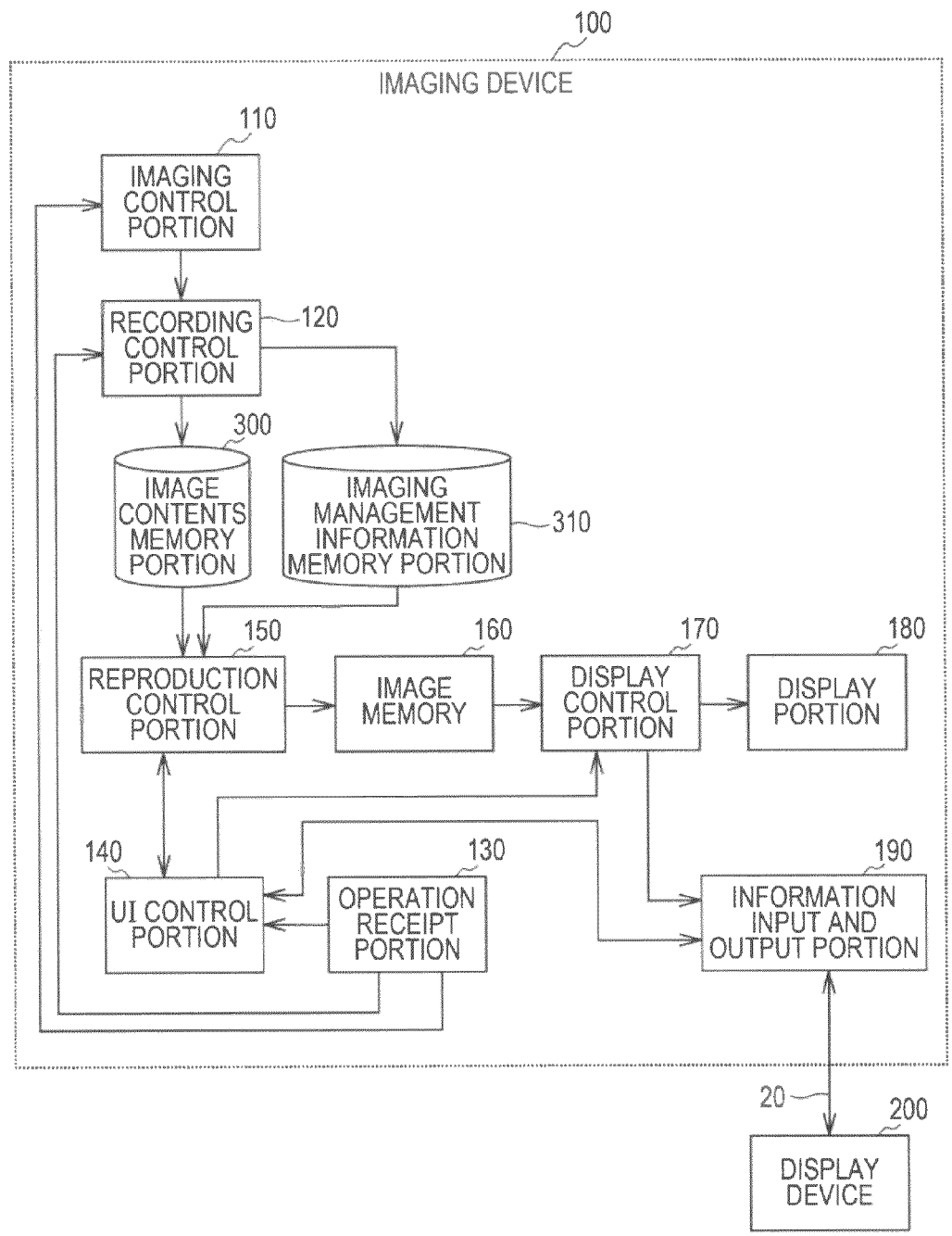

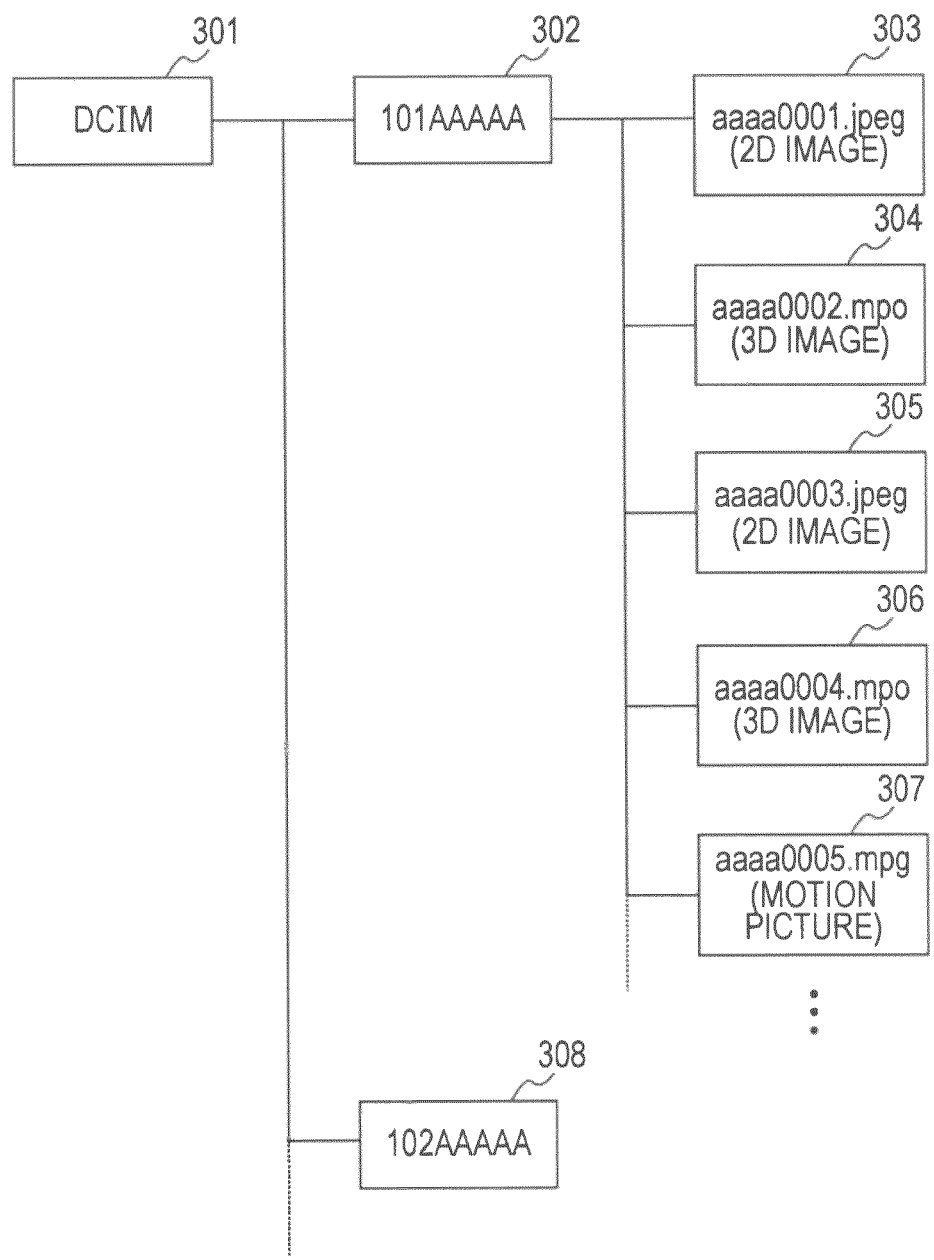

FIG. 4A

| 400 | |
|---|---|
| 410 — IMAGE MANAGEMENT INFORMATION | |
| 411 — POINT OF VIEW INFORMATION | TWO POINTS OF VIEW |
| 412 — REPRESENTATIVE IMAGE INFORMATION | LEFT POINT OF VIEW IMAGE |
| ... | ... |
| 420 — IMAGE INFORMATION | |
| 421 — LEFT POINT OF VIEW INFORMATION | ... |
| 422 — LEST POINT OF VIEW IMAGE INFORMATION | ... |
| 423 — LEFT POINT OF VIEW IMAGE DATA | 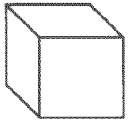 |
| 424 — RIGHT POINT OF VIEW INFORMATION | ... |
| 425 — RIGHT POINT OF VIEW IMAGE INFORMATION | ... |
| 426 — RIGHT POINT OF VIEW IMAGE DATA | 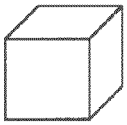 |

FIG. 4B

| 430 | |
|---|---|
| 440 — IMAGE MANAGEMENT INFORMATION | |
| ... | ... |
| 450 — IMAGE INFORMATION | |
| ... | ... |
| 451 — IMAGE DATA | 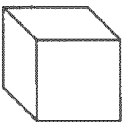 |

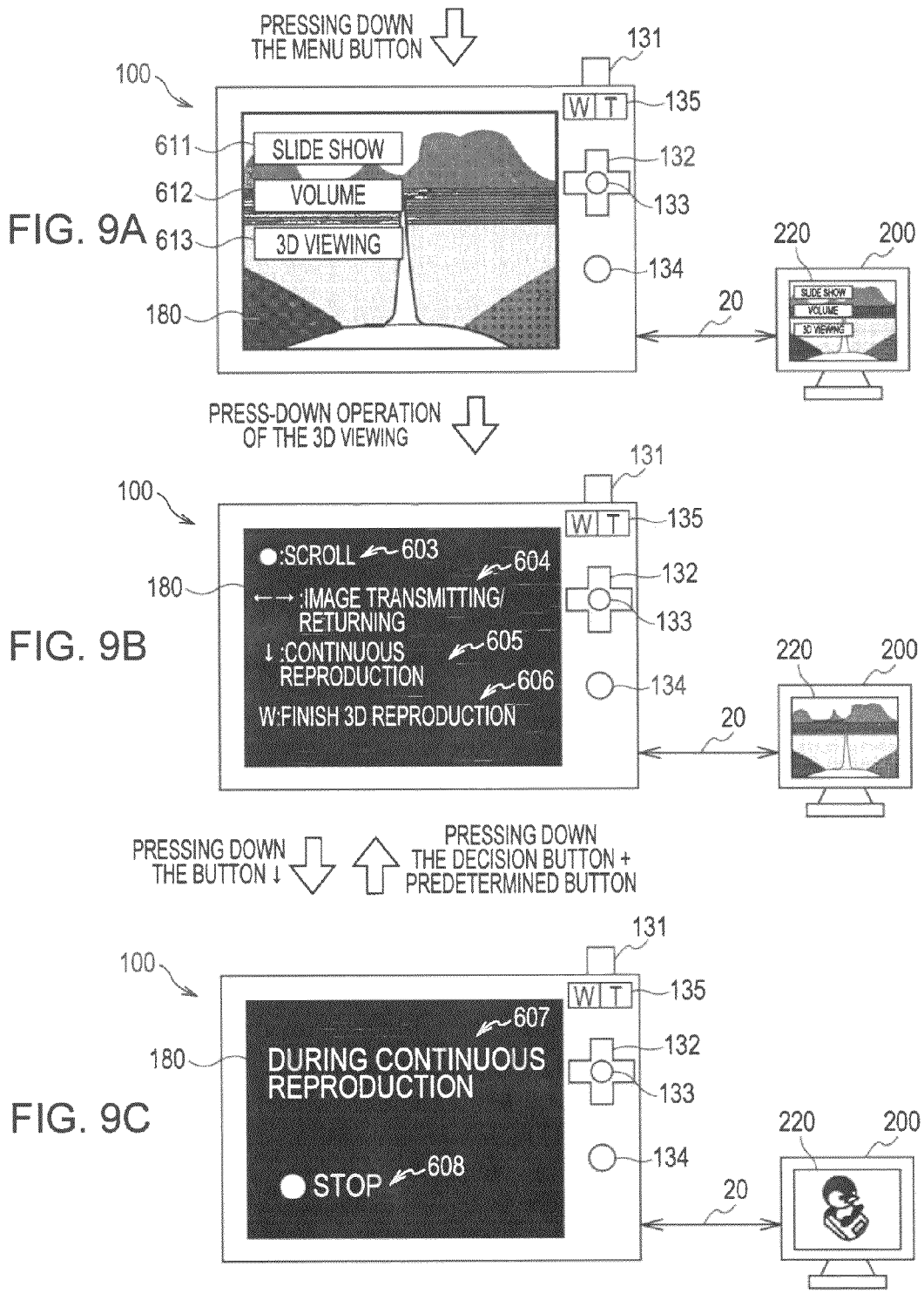

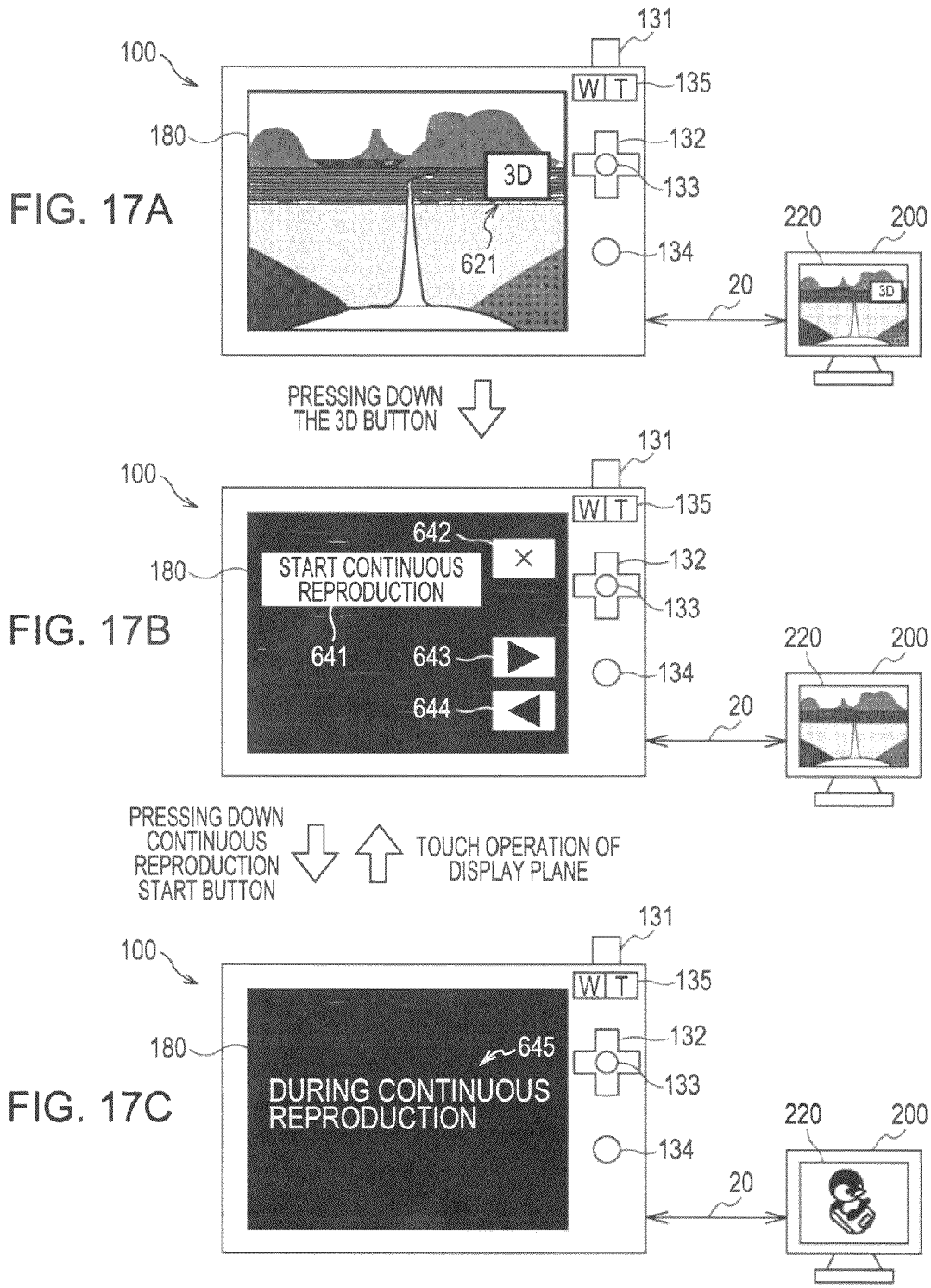

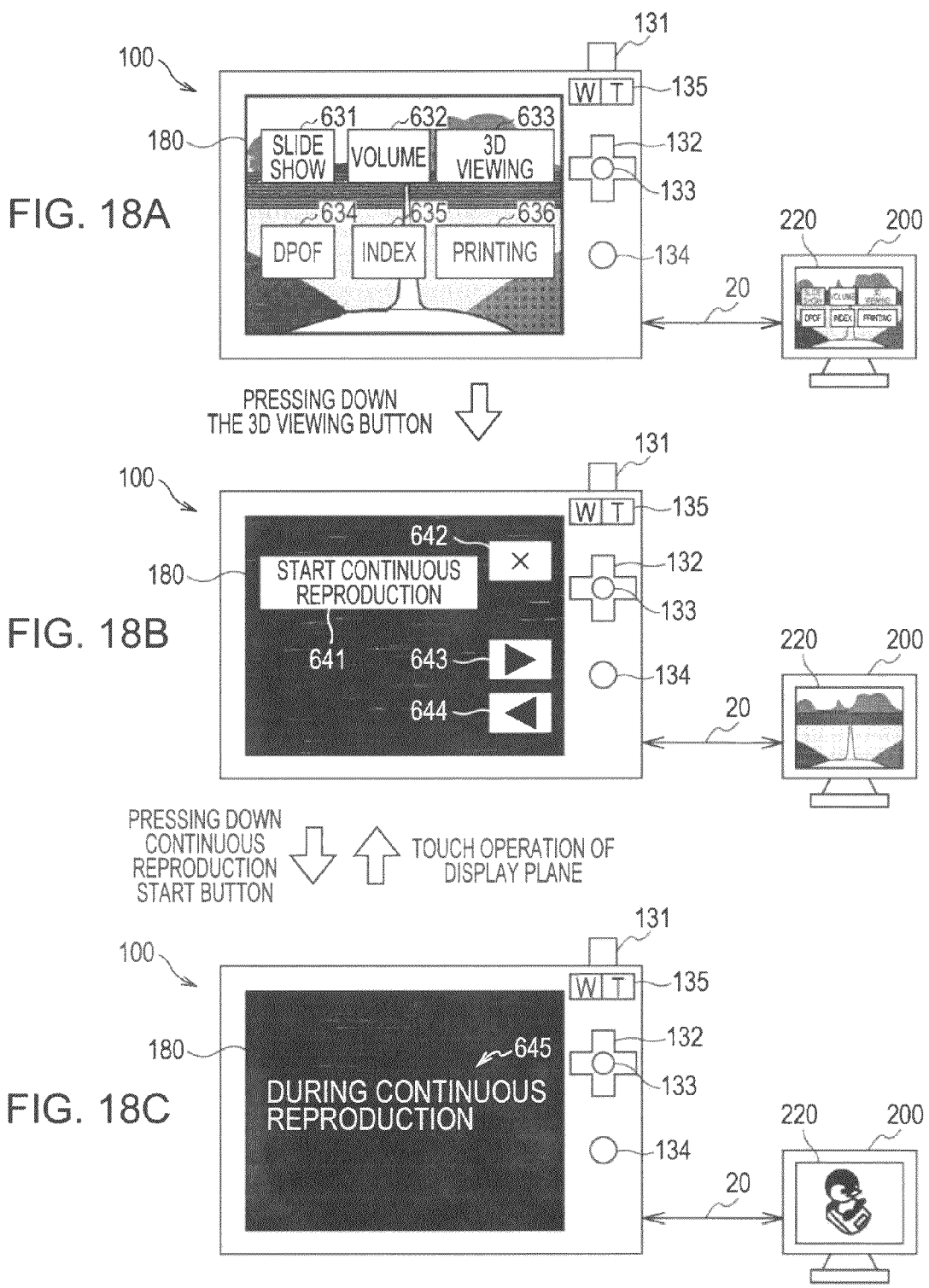

IMAGE PROCESSING DEVICE, IMAGE PROCESSING METHOD AND PROGRAM

BACKGROUND OF THE INVENTION

1. Field of the Invention

The present invention relates to an image processing device. Particularly, the invention relates to an image processing device and an image processing method that display a stereoscopic image and a program that executes the method in a computer.

2. Description of the Related Art

Recently, the use of imaging devices such as a digital still camera or a digital video camera (e.g., a recorder equipped with a camera), which images a subject such as a person or an animal to create image data, thereby recording the image data as image content, has become widespread. Furthermore, a reproduction method is suggested which sequentially outputs the respective image content thus recorded to a display device such as a television and displays the respective image content with respect to the display device.

For example, an image processing system is suggested which is connected to an imaging device and a television via a cable and displays an image recorded by the imaging device on the television (e.g., Japanese Unexamined Patent Application Publication No. 2004-320614 (FIG. 1)).

SUMMARY OF THE INVENTION

According to the related art mentioned above, since it is possible to display and see the image content recorded by the imaging device on a large display device, a user can further enjoy the image content.

Herein, recently, many stereoscopic image display methods have been proposed for displaying a stereoscopic image which can realize three-dimensional vision using a parallax of a left eye and a right eye. Furthermore, an imaging device such as a digital still camera or a digital video camera (a recorder equipped with a camera) is suggested which records the image data for displaying the stereoscopic image as the image content (the stereoscopic image content). In this manner, since the stereoscopic image content can be recorded by the imaging device, for example, it is also supposed that the recorded stereoscopic image content is sequentially output to a display device such as a television, thereby displaying the stereoscopic image on the display device.

Furthermore, an imaging device is suggested which allocates the stereoscopic image content and the planar image content to the same folder and can perform content processing (e.g., the processing by the imaging date unit) depending on the preference of a user. For that reason, for example, it is also supposed that the plane image content and the stereoscopic image content allocated to the same folder are displayed on the display device depending on user operation.

For example, in a case where the stereoscopic image content and the plane image content are mixed in the same folder, a case of sequentially displaying the image content belonging to the folder in a predetermined order (e.g., a recording time order) is supposed. For example, in order to enjoy the image becoming the display target, it is considered that the image content belonging to the folder is sequentially displayed in a predetermined order, while performing the switch-over processing of the display mode (the stereoscopic image display mode and the plane image display mode) depending on the type of the image content. However, when the stereoscopic image content and the plane image content are mixed with each other in the same folder, there is a chance that the switch-over processing of the display mode is frequently performed. Herein, when performing the switch-over processing of the display mode, there is a necessity to perform the switch-over processing in the display device. For that reason, it is difficult to suitably display the image becoming the display target by the time relating to the switch-over processing of the display mode, whereby the image thereof becomes hard to see.

It is desirable to make the stereoscopic image easier to see in the case of outputting and displaying the stereoscopic image on an external display device.

According to a first embodiment of the present invention, there is provided an image processing device, an image processing method, and a program that executes the method in a computer, including, an operation reception portion which receives the instruction operation for displaying a desired image from a plane image or a stereoscopic image stored in a recording medium; an information output portion which is connected to a display device displaying the plane image or the stereoscopic image to output image information for displaying the image stored in the recording medium on the display device; and a control portion which performs the control of displaying the image stored in the recording medium on the display device based on the received instruction operation and, when the instruction operation displaying the stereoscopic image as the instruction operation is received, the stereoscopic image from the image stored in the recording medium is extracted and the extracted stereoscopic image is continuously displayed on the display device. As a result, there is provided an action, in which, when the instruction operation displaying the desired image of the plane image or the stereoscopic image stored in the recording medium is received on the instruction operation thereof, a display control is performed on the image stored in the recording medium by the display device, and when the instruction operation displaying the stereoscopic image is received, the stereoscopic image of the image stored in the recording medium is extracted, and the extracted stereoscopic image is continuously displayed on the display device.

Furthermore, in the first embodiment, a setting portion is further included which sets a first mode which sequentially displays the image stored in the recording medium on the display device by the manual operation of a user, and a second mode which automatically and sequentially displays the image stored in the recording medium on the display device, as an operation mode for performing the display operation of the image to be displayed on the display device. When the instruction operation displaying the stereoscopic image is received, in a case where the second mode is set, the control portion may set the first mode. As a result, there is provided an action, in which, when the instruction operation displaying the stereoscopic image is received, in a case where the second mode is set, the first mode is set.

Furthermore, in the first embodiment, the control portion may perform the control in which, when the instruction operation displaying the stereoscopic image is received, the stereoscopic image allocated to the folder to which the image displayed on the display device belongs is extracted from the recording medium. As a result, there is provided an action, in which, the control is performed so that, when the instruction operation displaying the stereoscopic image is received, the stereoscopic image allocated to the folder to which the image displayed on the display device belongs to is extracted from the recording medium.

Furthermore, in the first embodiment, the control portion may perform the control, in which, when the instruction operation displaying the stereoscopic image is received, in a case where the plane image is displayed on the display device, the extracted stereoscopic image instead of the plane image is displayed on the display device. As a result, there is provided an action in which, the control is performed so that, when the instruction operation displaying the stereoscopic image is received, in a case where the plane image is displayed on the display device, the extracted stereoscopic image instead of the plane image is displayed on the display device.

Furthermore, in the first embodiment, when the instruction operation displaying the stereoscopic image is received, the control portion may perform the extraction of the stereoscopic image on the condition that the information output portion is connected to the display device. As a result, there is provided an action in which, when the instruction operation displaying the stereoscopic image is received, the extraction of the stereoscopic image is performed on the condition that the information output portion is connected to the display device.

Moreover, in the first embodiment, the operation reception portion receives the setting operation, which sets any one of the stereoscopic image display mode for displaying the stereoscopic image on the display device and the plane image display mode for displaying the plane image on the display device, as the instruction operation, and the control portion may perform the control so that, when the instruction operation setting the stereoscopic image display mode is received, the extraction of the stereoscopic image is performed and the extracted stereoscopic image is continuously displayed on the display device. As a result, there is provided an action in which the control is performed so that, when the instruction operation setting the stereoscopic image is received, the extraction of the stereoscopic image display mode is performed, and the extracted stereoscopic image is continuously displayed on the display device.

Furthermore, in the first embodiment, the control portion may perform the control so that, when the plane image display mode is set, in regard to the plane image stored in the recording medium, the plane image is displayed on the display device, and in regard to the stereoscopic image stored in the recording medium, the stereoscopic image is set as the plane image and the plane image is displayed on the display device. As a result, there is provided an action in which the control is performed so that, when the plane image display mode is set, in regard to the plane image stored in the recording medium, the plane image is displayed on the display device, and in regard to the stereoscopic image stored in the recording medium, the stereoscopic image is set as the plane image and the plane image is displayed on the display device.

According to an embodiment of the present invention, it is possible to obtain a superior effect in which the stereoscopic image can be easily viewed in the case of outputting and displaying the stereoscopic image to the external display device.

BRIEF DESCRIPTION OF THE DRAWINGS

FIG. 2 is a block diagram that shows a functional configuration example of an imaging device in the first embodiment of the present invention;

FIG. 3 is a diagram that shows an example of a file configuration of an image file (image content) which is stored in image content memory portion in the first embodiment of the present invention;

FIGS. 4A and 4B are diagrams that schematically show examples of a basic structure of a file configuration of an image file (image content) which is stored in image content memory portion in the first embodiment of the present invention;

FIGS. 9A to 9C are diagrams that show display examples of a display portion 180 (an imaging device) and a display portion 220 (a display device) in the first embodiment of the present invention;

FIGS. 17A to 17C are diagrams that show display examples of a display portion 180 (an imaging device) and a display portion 220 (a display device) in the first embodiment of the present invention; and FIGS. 18A to 18C are diagrams that show display examples of a display portion 180 (an imaging device) and a display portion 220 (a display device) in the first embodiment of the present invention.

DESCRIPTION OF THE PREFERRED EMBODIMENTS

Hereinafter, embodiments for carrying out the present invention (hereinafter, referred to as embodiments) will be described. The description will be made in the following order.

1. First Embodiment (a display control: an example in which a stereoscopic image is extracted and the stereoscopic image is continuously displayed on a display device when a 3D viewing mode is set)
2. Modified Example

1. First Embodiment

Configuration Example of Content Reproduction System

Figure 1:
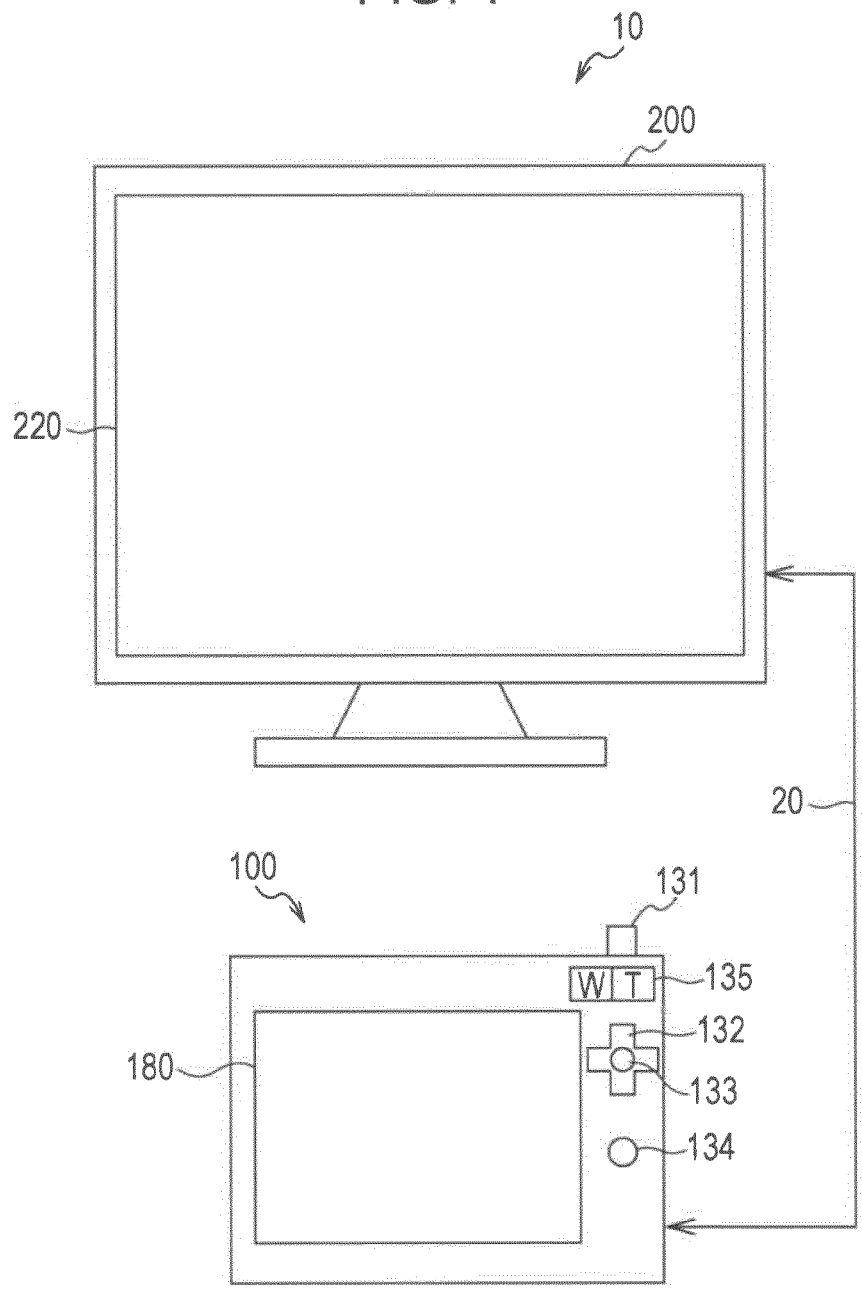
FIG. 1 is a diagram that shows a system configuration example of a content reproduction system in a first embodiment of the present invention.

FIG. 1 is a diagram that shows a system configuration example of a content reproduction system 10 of a first embodiment of the present invention. The content reproduction system 10 includes an imaging device 100 and a display device 200. Furthermore, the imaging device 100 and the display device 200 are connected to each other by an inter-device interface 20. The inter-device interface 20 can use, for example, a HDMI (High-Definition Multimedia Interface) cable. In addition, as the inter-device interface 20, another inter-device interface may be used in which the imaging device 100 and the display device 200 are connected to each other by wire or wirelessly, whereby the communication between the imaging device 100 and the display device 200 can be performed.

The imaging device 100 is an imaging device which images a subject to create a captured image (image data) and can record the captured image thus created on a recording medium as image content (still screen content or motion picture content). Furthermore, the imaging device 100 is an imaging device that can create the image content for displaying the stereoscopic image (3D image). For example, the imaging device 100 images the subject to create two captured images (a left eye image and a right eye image for displaying the stereoscopic image), and creates the image content for displaying the stereoscopic image based on two captured images thus created.

Furthermore, the imaging device 100 outputs the image content stored in the recording medium to the display device 200 via the inter-device interface 20 and displays the output image content on the display device 200. In this case, it is possible to display the same image as the image which is displayed on the display device 200, on the display portion 180. Moreover, for example, the imaging device 100 has the function of outputting the image content (the stereoscopic image) stored in the recording medium to the display device 200 and performing the 3D viewing reproduction (e.g., a slide show) in the display device 200. During reproduction or the like, the respective operating members (131 to 135) are used. In addition, the zoom button 135 is a button which is operated upon adjusting the magnification of the zoom at the time of imaging, and is constituted by a W (wait) button and a T (tell) button. In addition, the imaging device 100 is realized by a digital still camera or a digital video camera (e.g., a recorder equipped with a camera). Furthermore, the functional configuration of the imaging device 100 will be specifically described with reference to FIG. 2.

The display device 200 is a display device that can display the image content, which is input from the imaging device 100 via the inter-device interface 20 and a connection terminal (not shown), on the display portion 220. Furthermore, a user wears specialized glasses (e.g., active shutter type glasses or polarizing plate type glasses) for viewing the stereoscopic image, whereby the display device 200 can provide a user with the stereoscopic image.

For example, a case is supposed where a user wears active shutter type glasses (glasses with a shutter mechanism attached thereto) as the specialized glasses and the stereoscopic image is displayed. In this case, the display device 200 displays the image content (the stereoscopic image content), which is input from the imaging device 100, on the display portion 220 by a frame sequential display method (a method of alternately displaying the right eye image and the left eye image). Furthermore, the specialized glasses (the active shutter type glasses) alternately open and close the liquid crystal shutter (an electronic shutter) equivalent to the lens portion of the specialized glasses in synchronization with the left eye image and the right eye image that are alternately displayed on the display portion 220. That is, when the right eye image is displayed on the display portion 220, the left eye lens of the specialized glasses is closed, and when the left eye image is displayed on the display portion 220, the right eye lens of the specialized glasses is closed. In this manner, a user views the image, which is displayed on the display portion 220 (one display), using the specialized glasses, whereby the stereoscopic image can be viewed. For example, the display device 200 is realized by a video viewing device such as a television capable of displaying the stereoscopic images.

Configuration Example of Imaging Device

FIG. 2 is a block diagram that shows a functional configuration example of the imaging device 100 in a first embodiment of the present invention. The imaging device 100 includes an imaging control portion 110, a recording control portion 120, an operational reception portion 130, a UI control portion 140, a reproduction control portion 150, an image memory 160, a display control portion 170, a display portion 180, and an information input and output portion 190. Furthermore, the imaging device 100 includes image content memory portion 300 and an image processing information memory portion 310.

The image content memory portion 300 stores the image content (an image file) based on the recording control by the recording control portion 120. As the image content, for example, plane image content (a 2D image), stereoscopic image content (3D image), and motion image content are stored. In addition, the respective image content is stored, for example, based on a DCF (Design rule for Camera File system) standard. Furthermore, in the respective image content, attribute information (attribute information such as type of image content, an image updating date and time, image size, color space information, a maker name or the like) is recorded. As a result, the kind of the respective image content can be distinguished.

The image processing information memory portion 310 stores the processing information (the image processing information) concerning the image content stored in the image content memory portion 300 based on the recording control by the recording control portion 120. The kinds of the respective image content can be distinguished using the image processing information. In addition, the image content memory portion 300 and the image processing information memory portion 310 may be built into the imaging device 100 and may be attachable to and detachable from the imaging device 100.

The imaging control portion 110 includes an imaging portion corresponding to the stereoscopic imaging, images the subject to create the captured image (the image data) based on a user operation received by the operation reception portion 130, and outputs the captured image created to the recording control portion 120. For example, when the recording instruction operation (e.g., a pressing operation of a shutter button 131 shown in FIG. 1) of recording the 2D image content is received, the imaging control portion 110 creates one captured image. Furthermore, for example, when the recording instruction operation of recording the motion picture content is received, the imaging control portion 110 creates the motion picture. Moreover, for example, when the recording instruction operation of recording the 3D image content is received, the imaging control portion 110 images the subject to create two captured images (the left eye image and the right eye image for displaying the stereoscopic image).

The recording control portion 120 records the captured image supplied from the imaging control portion 110 in the image content memory portion 300 as the image content (image files). During recording, various information (imaging date and time, image size, and the kind of content) concerning the imaging time by the imaging control portion 110 is recorded in the image content. Moreover, the recording control portion 120 records the image processing information concerning the recorded image content in the image processing information memory portion 310.

The operation reception portion 130 is an operation reception portion which receives the operation input from a user, and outputs the operation content depending on the reception operation input to the imaging control portion 110, the recording control portion 120, and the UI control portion 140. For example, operation members such as a shutter button 131, a cross button 132, a decision button 133, an operation buttons 134, a zoom button 135 shown in FIG. 1 are included in the imaging device 100, and the operation input is received by these members. For example, when the setting operation of setting the 2D viewing mode (the plane image display mode) or the 3D viewing mode (the stereoscopic image display mode) as the viewing mode of the display device 200 is received, the operation reception portion 130 outputs this to the UI control portion 140. Furthermore, when the change operation (e.g., the image transmission operation, and the image return operation) of changing the display state of the image, which is displayed on the display device 200, is received, the operation reception portion 130 outputs this to the UI control portion 140. Furthermore, when a setting operation is received which sets an operation mode (a manual reproduction mode (a first mode) and an automatic reproduction mode (a second mode)) for performing the display operation of the image to be displayed on the display device 200, the operation reception portion 130 outputs this to the UI control portion 140. Herein, the manual reproduction mode is a reproduction mode that sequentially displays the image on the display device 200 by performing the image transmission or the like by a manual operation of a user, and the automatic reproduction mode is a reproduction mode that automatically performs the image transmission or the like for each certain time.

The UI control portion 140 performs the control that displays the image content, which is stored in the image content memory portion 300, on the display portion 180 and the display device 200 based on the operation input received by the operation reception portion 130. For example, the UI control portion 140 sets any one of the 3D viewing mode (the stereoscopic image display mode) for displaying the stereoscopic image on the display device 200 and the 2D viewing mode (the plane image display mode) for displaying the plane image on the display device 200. For example, when the 2D viewing mode is set, the UI control portion 140 performs the control that displays the display target image (or, an image in which the operational support information (for example, the operational support information 601 shown in FIG. 7A) is overlapped with the display target image), on the display portion 180 and the display device 200. Furthermore, for example, when the 3D viewing mode is set, the UI control portion 140 performs the control so that the display target image is not displayed on the display portion 180 but the operational support information (for example, the operational support information shown in FIGS. 8B and 8C) is displayed on the display portion 180. In this case, the UI control portion 140 performs the setting control that extracts only the stereoscopic image content among the image content stored in the image content memory portion 300 and continuously displays the stereoscopic image on the display device 200 based on the extracted stereoscopic image content. In addition, when the setting operation of the 3D viewing mode is performed, the UI control portion 140 performs the extraction of the stereoscopic image content on the condition that the information input and output portion 190 is connected to the display device 200. Furthermore, the UI control portion 140 is an example of the control portion and the setting portion described in the claims.

The reproduction control portion 150 performs the reproduction control for displaying the image content, which is stored in the image content memory portion 300, on the display portion 180 and the display device 200, based on the control of the UI control portion 140. For example, when the reproduction instruction operation of the image content is performed, the reproduction control portion 150 acquires and decodes the image content designated by a user from the image content memory portion 300, and develops the decoded image data to a predetermined area in the image memory 160. Moreover, the reproduction control portion 150 distinguishes the kinds (2D image content, 3D image content, and motion picture content) of the image content acquired from the image content memory portion 300, and notifies the determination results thereof to the UI control portion 140. In addition, regarding the distinction of the kind of the image content, the attribute information recorded in the image content may be used, and the image processing information stored in image processing information memory portion 310 may be used. Moreover, the reproduction control portion 150 extracts the stereoscopic image content from the image content memory portion 300 when the 3D viewing mode is set. Based on the extracted stereoscopic image contents, the stereoscopic image is continuously displayed on the display device 200.

The image memory 160 maintains the image data decoded from the reproduction control portion 150 and supplies the maintained image data to the display control portion 170.

The display control portion 170 controls the display state in the display portion 180 and the display device 200 based on the control of the UI control portion 140. For example, in a case where the 2D viewing mode is set, when the display target image is the 2D image, the display control portion 170 creates the image (the 2D image) in which the operational support information is overlapped with the image data maintained in the image memory 160. The operational support information is an OSD (on-screen display) image and, for example, is the operational support information 601 shown in FIG. 7A. In addition, the operational support information will be specifically described with reference to FIGS. 7A, 7B and 7C or the like. Moreover, the display control portion 170 displays the created 2D image on the display portion 180 and the display device 200. That is, the display control portion 170 displays the created 2D image on the display portion 180 and transmits the image information (e.g., the data stream) for displaying the created 2D image on the display device 200 to the display device 200 via the information input and output portion 190.

Furthermore, for example, in a case where the 2D viewing mode is set, when the display target image is the 3D image, the display control portion 170 displays the image data, which is maintained in the image memory 160, as the 2D image on the display portion 180 and the display device 200. That is, the display control portion 170 creates the 2D image using either the right eye image or the left eye image constituting the 3D image, overlaps the operational support information with the 2D image and displays this on the display portion 180 and the display device 200.

Furthermore, for example, in a case where the 3D viewing mode is set, based on the stereoscopic image content extracted from the image content memory portion 300, the stereoscopic image is continuously displayed on the display device 200. For that reason, for example, when the 3D viewing mode is set, the display control portion 170 displays the image data, which is maintained in the image memory 160, as the 3D image on the display device 200. In this case, the display control portion 170 displays the 3D image on the display device 200, and does not display the 3D image but displays the operational support information (e.g., the operational support information 603 to 608 shown in FIGS. 8A to 8C) on the display portion 180. That is, the display control portion 170 displays the operational support information on the display portion 180, and transmits the image information (e.g., the data stream) for displaying the 3D image on the display device 200 to the display device 200 via the information input and output portion 190. These display examples will be explained in detail with reference to FIG. 7A to 9C or the like.

The display portion 180 is a display portion that displays various information (plane images) based on the control of the display control portion 170. As the display portion 180, for example, a LCD (Liquid Crystal Display), an organic EL (Electro Luminescence) panel or the like can be used. In addition, the operation reception portion 130 and the display portion 180 may be integrally constituted by a touch panel that can perform various input operations by the contact or the proximity of a finger or the like on the display screen. An example of using the touch panel will be explained in detail with reference to FIGS. 16A to 18C.

The information input and output portion 190 is connected to the display device 200 via the inter-device interface 20, and performs the input and output of various information performed between it and the display device 200 based on the control of the UI control portion 140. For example, the information input and output portion 190 transmits the data stream, which is created by the display control portion 170 as the image information for displaying the image on the display device 200, to the display device 200. Furthermore, for example, in a case where the setting operation of setting the 3D viewing mode as the viewing mode of the display device 200 is received by the operation reception portion 130, the information input and output portion 190 transmits the 3D viewing mode setting information for setting the 3D viewing mode to the display device 200. Moreover, for example, in a case where the setting operation of setting the 2D viewing mode as the viewing mode of the display device 200 is received by the operation reception portion 130, the information input and output portion 190 transmits the 2D viewing mode setting information for setting the 2D viewing mode to the display device 200. In addition, the information input and output portion 190 is an example of an information output portion described in the claims.

Configuration Example of Image File

FIG. 3 is a diagram that shows an example of a file configuration of an image file (image content) stored in the image content memory portion 300 in the first embodiment of the present invention. In this example, a directory structure of the file is shown. As shown in FIG. 3, a file structure of the image file to be recorded by a DCF (Design rule for Camera File system) standard is schematically shown. The DCF is a file system standard for realizing the mutual use of the image via the recording medium between mechanisms such as a digital still camera or a printer. Furthermore, in the DCF, an attachment method of a file name or the configuration of the folder in a case, where an Exif (exchangeable image file format) is used as a base to record the recording medium, is defined. The Exif is the standard for adding the image data and the camera information to the image file and defines the format (the file format) for recording the image file. Furthermore, in the DCF standard, the image file is recorded in the recording medium by the directory structure. In addition, in an average DCF standard, a directory "DCIM" 301 is disposed just under a root directory (ROOT).

Furthermore, the DCF directory (e.g., "101AAAAA" 302 and "102AAAAA" 308) is disposed under the directory "DCIM" 301. A directory name of the DCF directory (folder) is eight characters and the first character to the third character are directory numbers from 100 to 999. Furthermore, five characters from the fourth character to the ninth character are characters that are called free characters in which only en quad capital English and number characters are used.

Moreover, an image file is disposed under the respective DCF directory. For example, image files 303 to 307 are disposed under the DCF directory "101AAAAA" 302. The file names of the image file are eight characters except for the extension, and the first character to the fourth character are free characters in which only en quad capital English and number characters are used. In addition, the fifth character to the eighth character are file numbers from 0001 to 9999. In addition, the image files 303 to 307 are image files (image content) that are constituted by the image data created by the imaging control portion 110. In addition, in the case of a JPEG (Joint Photographic Coding Experts Group) format, as an extension of the still image file, ".JPG" is used. Furthermore, in the case of a MPEG (Moving Picture Experts Group) format, as an extension of the motion picture file ".MPG" is used. IN addition, in the case of the MPO (Multi-Picture Format) type, as the extension of the file of the stereoscopic image, ".MPO" is used.

FIGS. 4A and 4B are diagrams that schematically show an example of a basic structure of a file configuration of an image file (image content) stored in the image content memory portion 300 in the first embodiment of the present invention. FIG. 4A shows an example of a basic structure of a 3D image (the stereoscopic image) file, and FIG. 4B shows an example of a basic structure of a 2D image (the plane image) file.

As shown in FIG. 4A, the 3D image file 400 is a file that has a basic structure of image processing information 410 and image information 420.

In the image processing information 410, various processing information (e.g., point of view information 411 and representative image information 412) for managing the image data housed in the image information 420 is stored. The point of view information 411 is information showing what point of view information is housed in the image file, and the representative image information 412 is information showing the point of view corresponding to the representative image among the respective point of views housed in the image file. In the example shown in FIG. 4A, as the point of view, since information of a left point of view and a right point of view are housed, "two point of views" are recorded in the point of view information 411. Furthermore, since the left point of view image is the representative image among the left point of view and the right point of view, a "left point of view image" is housed in the representative information 412.

In the image information 420, the respective point of view information (the left point of view information 421 and the right point of view information 424), the respective point of view image information (left point of view image information 422 and right point of view image information 425), and the respective point of view image data (the left point of view image data 423 and the right point of view image data 426) is recorded.

In the left point of view information 421 and the right point of view information 424, information concerning the positions of the respective point of views such as a base line length or an angle is housed. Herein, the base line length is a distance between two point of views at the time of the imaging of the corresponding image file and a value corresponding to an inter eye distance. Furthermore, the angle is an angle (an angle around one point) specified by two lines which connect two point of views at the time of the imaging of the corresponding image file with the subject (one point), and corresponds to the angle specified by two lines connecting two eyes and the subject (one point).

In the left point of view image information 422 and the right point of view image information 425, the date and time at which the corresponding image file is created (imaged), the image size thereof, a thumbnail image or the like is recorded.

In the left point of view image data 423 and the right point of view image data 426, image data of the main image (the left point of view image (left eye image) and the right point of view image (right eye image)) is recorded.

For example, in a case where the 2D viewing mode is set, when the display instruction operation of the 3D image file is performed, the image of the point of view recorded in the representative image information 412 of the image processing information 410 is displayed. For example, as shown in FIGS. 4A and 4B, when the 2D viewing mode is set and the display instruction operation of the 3D image file is performed, based on the image information 420 of the left point of view image recorded in the representative image information 412 of the image processing information 410, the left point of view image data 423 is decoded. Moreover, the decoded left point of view image is displayed.

Furthermore, as shown in FIG. 4B, the 2D image file 430 is a file that has a basic structure of image processing information 440 and image information 450.

In the image processing information 440, various processing information for managing the image data housed in the image information 450 is recorded.

In the image information 450, various image information (not shown) and the image data 451 is recorded. In the various image information, the date and time at which the corresponding image is created (imaged), the image size thereof, a thumbnail image or the like is recorded. Furthermore, in the image data 451, the image data of the main image is recorded.

Development Example of Stereoscopic Image

Figure 5A:
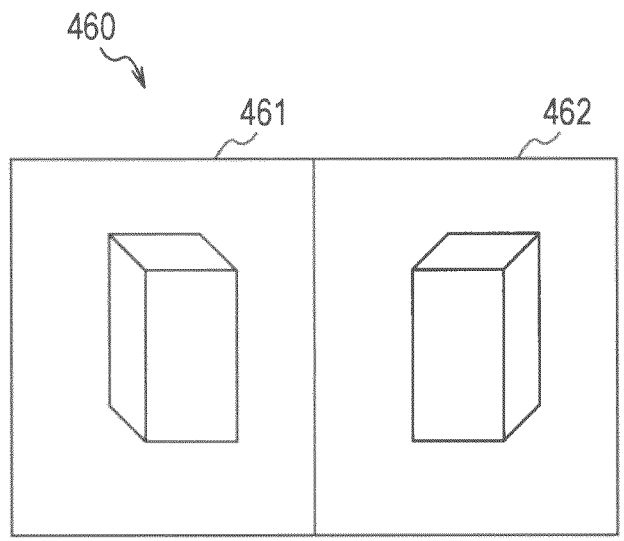
FIGS. 5A and 5B are diagrams that schematically show development examples of the stereoscopic image by a reproduction control portion in the first embodiment of the present invention.
Figure 5B:
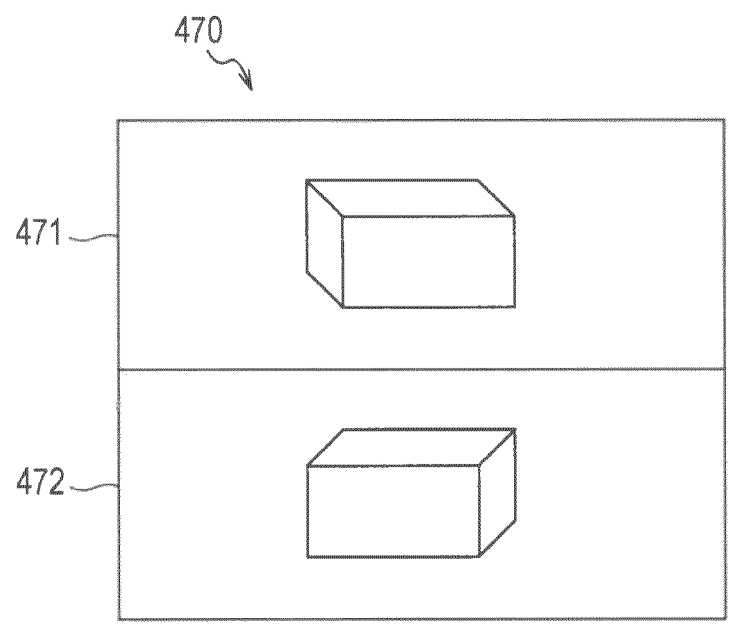

FIGS. 5A to 5B are diagrams that schematically show development examples of a stereoscopic image of the reproduction control portion 150 in the first embodiment of the present invention. As described above, the reproduction control portion 150 acquires and decodes the image content designated by a user from the image content memory portion 300 and develops the decoded image data to a predetermined area in the image memory 160. When the target image is a stereoscopic image, the reproduction control portion 150 develops the image data of the respective point of view images for displaying the stereoscopic image to a predetermined area in the image memory 160. In this case, depending on counterpart equipment connected to the imaging device 100, there is a case where it is necessary for an arrangement of the image of the respective point of views to be changed and developed or a case where it is necessary for the image of the respective point of views to be squeezed and developed.

FIG. 5A shows an example of a 3D image 460 (stereoscopic image) in which horizontal lengths in the left point of view image 461 and the right point of view image 462 are squeezed so as to be divided into two and are continuously developed in left and right.

FIG. 5B shows an example of a 3D image 470 (stereoscopic image) in which vertical lengths in the left point of view image 471 and the right point of view image 472 are squeezed so as to be divided into two and are continuously developed up and down.

In this manner, depending on the counterpart equipment connected to the imaging device 100, the stereoscopic image is developed and the stereoscopic image is transmitted to the counterpart equipment.

Extraction Example of Stereoscopic Image Content

FIGS. 6A and 6B are diagrams that schematically show an extraction processing of the stereoscopic image content of the reproduction control portion 150 in the first embodiment of the present invention.

FIG. 6A schematically shows image content 501 to 509 stored in the image content memory portion 300. The image content 501 to 509 are image content belonging to the folder 500. The folder 500 is, for example, a folder that houses the image content captured at the same date and time. Furthermore, the 3D image content 501, 504, 505 and 508 is stereoscopic image content, the 2D image content 502, 506, 507 and 509 is plane image content, and the motion picture content 503 is motion picture content.

For example, when the setting operation of the 3D viewing mode is performed by a user operation, based on the control of the UI control portion 140, the reproduction control portion 150 extracts the stereoscopic image content from the respective image content belonging to the folder including the image that becomes the reproduction target. In this case, the reproduction control portion 150 extracts, for example, the stereoscopic image content based on the extensions of the respective image content. Furthermore, the reproduction control portion 150 may extract the stereoscopic image content based on the image processing information stored in the image processing information memory portion 310.

FIG. 6B schematically shows the stereoscopic image content (shown in the 3D image content group 510) extracted from the image content 501 to 509 belonging to the folder 500. In this manner, when the setting operation of the 3D viewing mode is performed by a user operation, the reproduction control portion 150 extracts the stereoscopic image content and develops the extracted stereoscopic image content to the image memory 160. Moreover, the stereoscopic image developed in the image memory 160 is continuously displayed on the display device 200.

Display Example of Plane Image in Imaging Device and Display Device

Figure 7A:
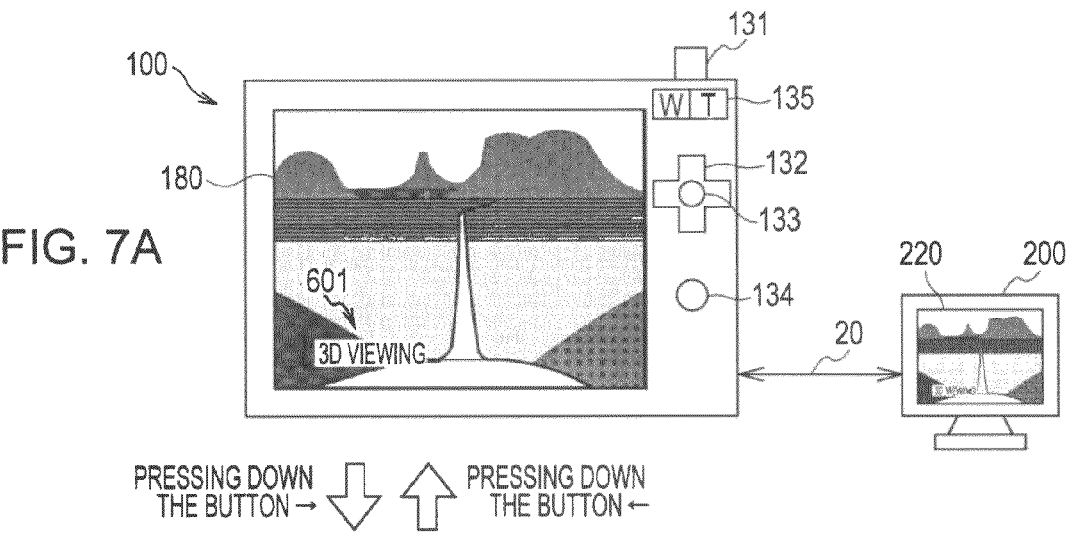
FIGS. 7A to 7C are diagrams that show display examples of a display portion 180 (an imaging device) and a display portion 220 (a display device) in the first embodiment of the present invention.
Figure 7B:
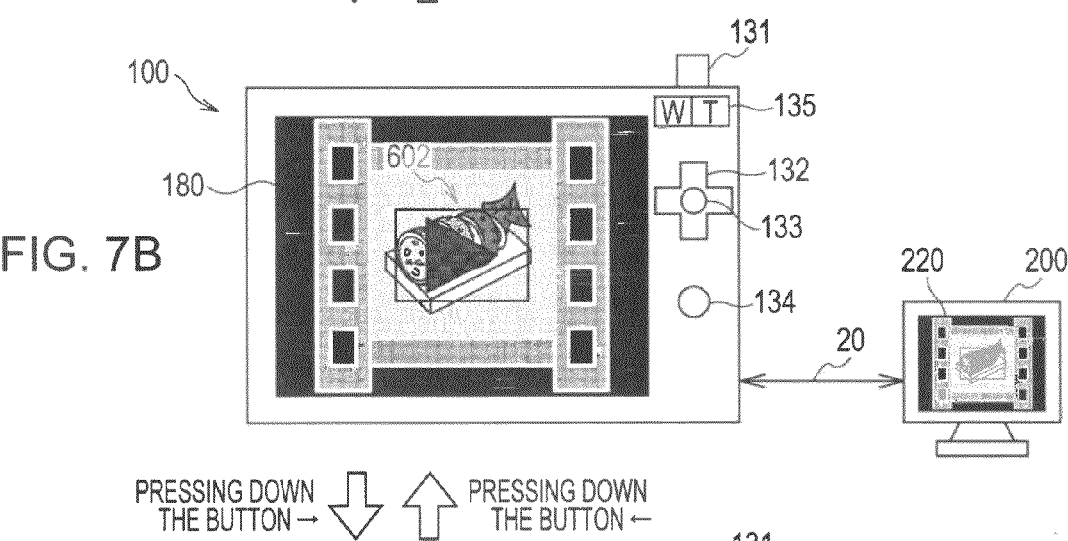
Figure 7C:
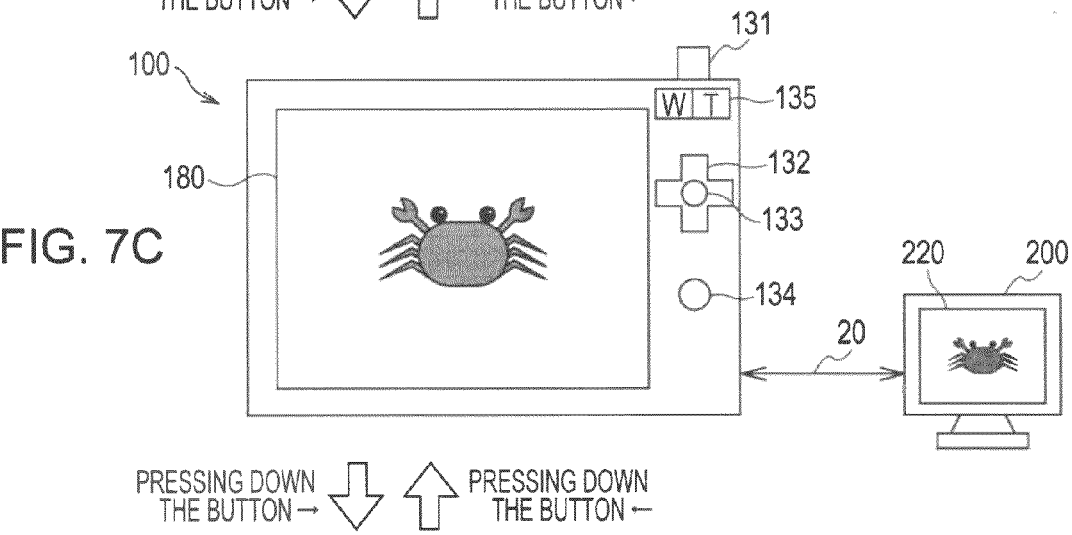

FIGS. 7A to 7C are diagrams that show the display examples of the display portion 180 (the imaging device 100) and the display portion 220 (the display device 200) in the first embodiment of the present invention. In addition, in the display example shown below, for convenience of explanation, the display portion 220 of the display device 200 is shown to be smaller than the display portion 180 of the imaging device 100.

FIGS. 7A to 7C show display transition example due to the image transmission operation in a case where the 2D viewing mode is set. FIG. 7A shows a display example in a case where the 3D image content (a background scene including a direct road extending to the wilderness) is displayed as the 2D image. Furthermore, FIG. 7B shows a display example in a case where the motion picture content (a motion picture concerning a squid side put on a chopping board) is displayed as the 2D image (representative image (e.g., a head frame)). Furthermore, FIG. 7C shows a display example in a case where the 2D image content (a crab) is displayed as a 2D image. The image transmission or the image returning can be performed, for example, by a push-down operation of left and right buttons of a cross button 132. Furthermore, for example, whenever the image transmission operation or the image returning operation is performed, the image content belonging to the same folder can be sequentially displayed.

Furthermore, as shown in FIGS. 7A to 7C, when the 2D viewing mode is set, approximately the same image is displayed on the display portion 180 (the imaging device 100) and the display portion 220 (the display device 200). Furthermore, as shown in FIGS. 7A and 7B, on the display portion 180 (the imaging device 100) and the display portion 220 (the display device 200), the operational support information 601 or 602 is displayed on the 2D image in an overlapped manner.

Herein, the operational support information 601 to 602 is, for example, information for supporting the operation thereof when a user performs the reproduction of the image content. As the operational support information, for example, the respective image information (e.g., imaging date and time, and image size) concerning the display target image, operation members (e.g., an image transmission button, an image return button, and a stop button), operation guide information for supporting the operation, and icons indicating various information is displayed.

Specifically, the operational support information 601 is a character which shows an operation guide for supporting the instruction operation for displaying the 3D image on the display device 200 when the image becoming the display target is the 3D image. Furthermore, the operational support information 602 is a character which shows an operation guide for supporting the instruction operation for starting the reproduction of the motion picture when the image becoming the display target is the motion picture.

In addition, in the present example, as the operational support information, the case of displaying the operational support information 601 or 602 was shown, but other operational support information may be displayed. In addition, since the operational support information 601 is displayed on the 2D image in an overlapped manner, it is desirable to display the same at the edge portion (e.g., an upper portion or a lower portion of the 2D image) of the 2D image so that the 2D image is easily viewed. Furthermore, the operational support information 602 is displayed on the 2D image in an overlapped manner, but, in order to promote the starting of the motion picture corresponding to the 2D image, it is desirable to prominently display the same in a middle portion of the 2D image.

In this manner, when the image content is sequentially displayed as the 2D image, in the state in which the display device 200 is set in the 2D viewing mode, the image transmission or the image return can be performed. Furthermore, by setting an automatic reproduction mode in which the image transmission is automatically performed for each certain time, a user does not perform the image transmission operation, and the 2D image can be sequentially displayed.

Herein, for example, in the case of performing the switch-over processing from the 2D viewing mode to the 3D viewing mode in the display device 200, there is a necessity for a complicated sequence in the switch-over processing depending on the display device of the connection place, and the processing time thereof is relatively lengthened (e.g., by about 5 seconds). For this reason, for example, immediately after the setting operation of the 3D viewing mode is performed in the imaging device 100, it is supposed that the display target image (3D image) is not displayed on the display device 200. That is, in the display screen shown in FIG. 6A, immediately after the setting operation (the push-down operation of the down button of the cross button 132) of the 3D viewing mode is performed, there is a period that becomes the state in which the display target image (3D image) is not displayed on the display device 200.

Furthermore, the setting completion of the 3D viewing mode may not be notified to the imaging device 100 depending on the display device of the connection place. In this manner, when the setting completion of the 3D viewing mode is not notified to the imaging device 100, a case is supposed where the automatic reproduction mode is not set at the time of the setting operation of the 3D viewing mode. In this case, it is supposed that the display target image (3D image) is not displayed on the display device 200, and, nevertheless, the image transmission processing is performed in the imaging device 100. For this reason, when the automatic reproduction mode is set at the time of switch-over processing from the 2D viewing mode to the 3D viewing mode, there is a concern that a user can hardly view a predetermined number of images (3D image) from the head image at the time of the switch-over operation.

Furthermore, when the 2D image is mixed with the 3D image as the display target image (e.g., when they are mixed with each other in the same folder), it is supposed that they are sequentially displayed by the image transmission operation or the automatic reproduction mode. In this case, when the viewing mode of the display device 200 is set depending on the kinds of the display target image, there is a chance that the switch-over processing from the 2D viewing mode to the 3D viewing mode and the switch-over processing from the 3D viewing mode to the 2D viewing mode are frequently performed. However, when the switch-over processing of the viewing mode is frequently performed, as mentioned above, immediately after the switch-over processing, there is a concern that a desired image is not displayed on the display device 200.

Thus, in the first embodiment of the present invention, in a case where the switch-over operation to the 3D viewing mode is performed, the manual reproduction mode is set and only the 3D image content is extracted. Moreover, the extracted 3D image content is continuously displayed on the display device 200. In this case, the 3D image is not displayed and only the operational support information is displayed on the display portion 180 (imaging device 100). The display example is shown in FIG. 8B. Furthermore, when the 3D viewing mode is set, the switch-over from the manual reproduction mode to the automatic reproduction mode can be performed by the user operation. The display example is shown in FIGS. 8B and 8C. In addition, even in a case where the automatic reproduction mode is set when the switch-over operation from the 3D viewing mode to the 2D viewing mode is performed, similarly, the manual reproduction mode may be set.

Display Transition Example in Imaging and Display Device

Figure 8A:
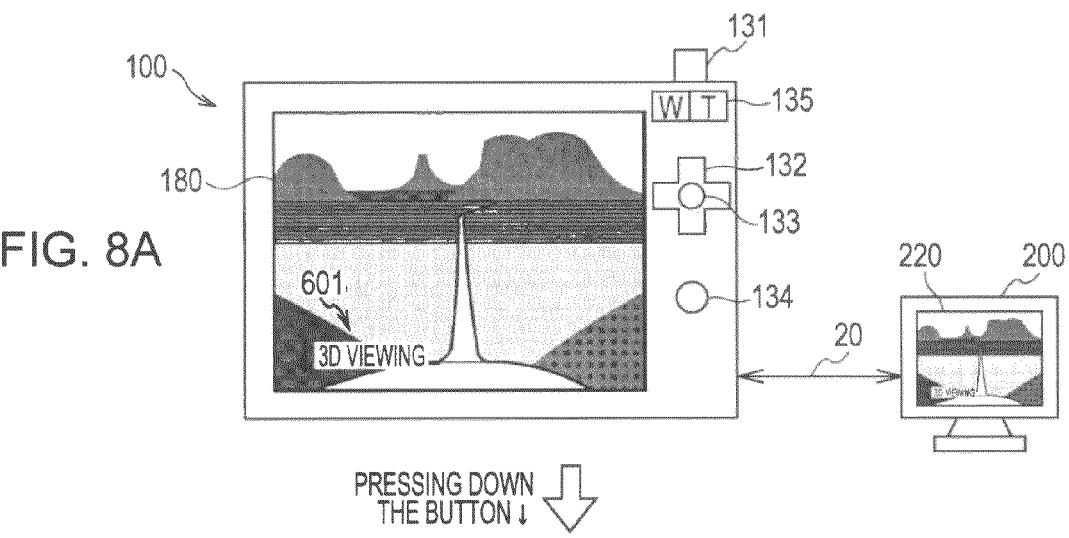
FIGS. 8A to 8C are diagrams that show display examples of a display portion 180 (an imaging device) and a display portion 220 (a display device) in the first embodiment of the present invention.
Figure 8B:
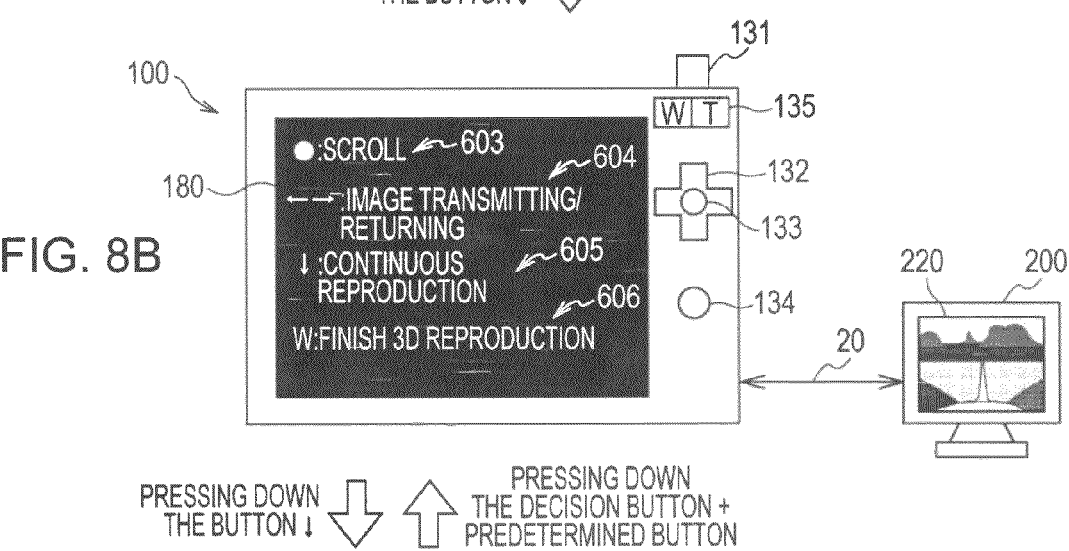
Figure 8C:
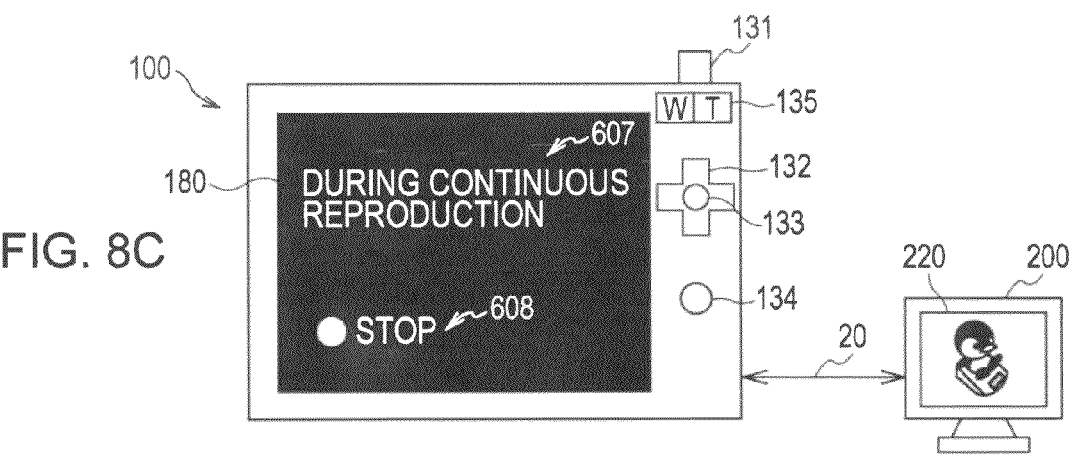

FIGS. 8A to 8C are drawings that show display examples of the display portion 180 (the imaging device 100) and the display portion 220 (the display device 200) in the first embodiment of the present invention. FIG. 8A is identical to the display example shown in FIG. 7A, and thus the explanation thereof will be omitted.

In a case where the display screen shown in FIG. 8A is displayed, when the setting operation which sets the 3D viewing mode is performed, the down button of the cross button 132 is pushed down according to the operational support information 601. When the push-down operation of the down button is performed, the UI control portion 140 transmits the setting information instructing the setting of the 3D viewing mode to the display device 200 and sets the manual reproduction mode in the imaging device 100. Furthermore, as shown in FIGS. 6A and 6B, the reproduction control portion 150 extracts the 3D image content from the image content stored in the image content memory portion 300 based on the control of the UI control portion 140. In this case, for example, the whole 3D image content may be extracted from the image content memory portion 300, and only the 3D image content in the folder, to which the image displayed at the time of the setting operation of the 3D viewing mode belongs, is extracted. Furthermore, for example, an upper limit of the 3D image content becoming the extraction target can be set, and the extraction of the 3D image content may be performed up to the number of the upper limit.

Herein, for example, when the display device 200 receives the setting information of the 3D viewing mode from the imaging device 100, the switch-over processing to the 3D viewing mode in the display device 200 is performed. During switch-over processing, on the display portion 220 of the display portion 200, the image showing during switch-over processing to the 3D viewing mode is displayed. As the image showing during switch-over processing to the 3D viewing mode, it is possible to display, for example, a unicolor (e.g., a black image), an image in which an icon shown during switch-over processing is overlapped with the black image or the like. Moreover, when the switch-over processing to the 3D viewing mode is finished, the display device 200 erases the image and displays the 3D image based on the image information received from the imaging device 100. The display example is shown in FIG. 8B.

FIG. 8B shows a display example (at the time of setting the manual reproduction mode) in a case where the 3D image is displayed on the display portion 220 (the display device 200). In this manner, when the 3D image is displayed on the display portion 220, the 3D image is not displayed but the operational support information 603 to 606 is displayed on the display portion 180 (the imaging device 100). In addition, the operational support information 603 is a character showing the operation guide for supporting the instruction operation in a case where the 3D image becoming the display target is subjected to a scroll operation. For example, the operational support information 603 shows that the 3D image becoming the display target can be subjected to the scroll operation by pushing down the decision button 133. Furthermore, the operational support information 604 is a character that shows the image transmission operation of the 3D image becoming the display target or the operation guide for supporting the image return operation. Furthermore, the operational support information 605 is a character that shows the operation guide for supporting the instruction operation (the setting operation of the automatic reproduction mode) starting the continuous reproduction of the 3D image becoming the display target. For example, the operational support information 605 shows that the automatic reproduction mode can be set by pushing down the down button of the cross button 132. Furthermore, the operational support information 606 is a character that shows the operation guide for supporting the instruction operation (the setting operation of the 2D viewing mode) which finishes the 3D viewing mode and sets the 2D viewing mode. For example, the operational support information 606 shows that the 2D viewing mode can be set by pushing down the W button of the zoom button 135.

Figure 6:
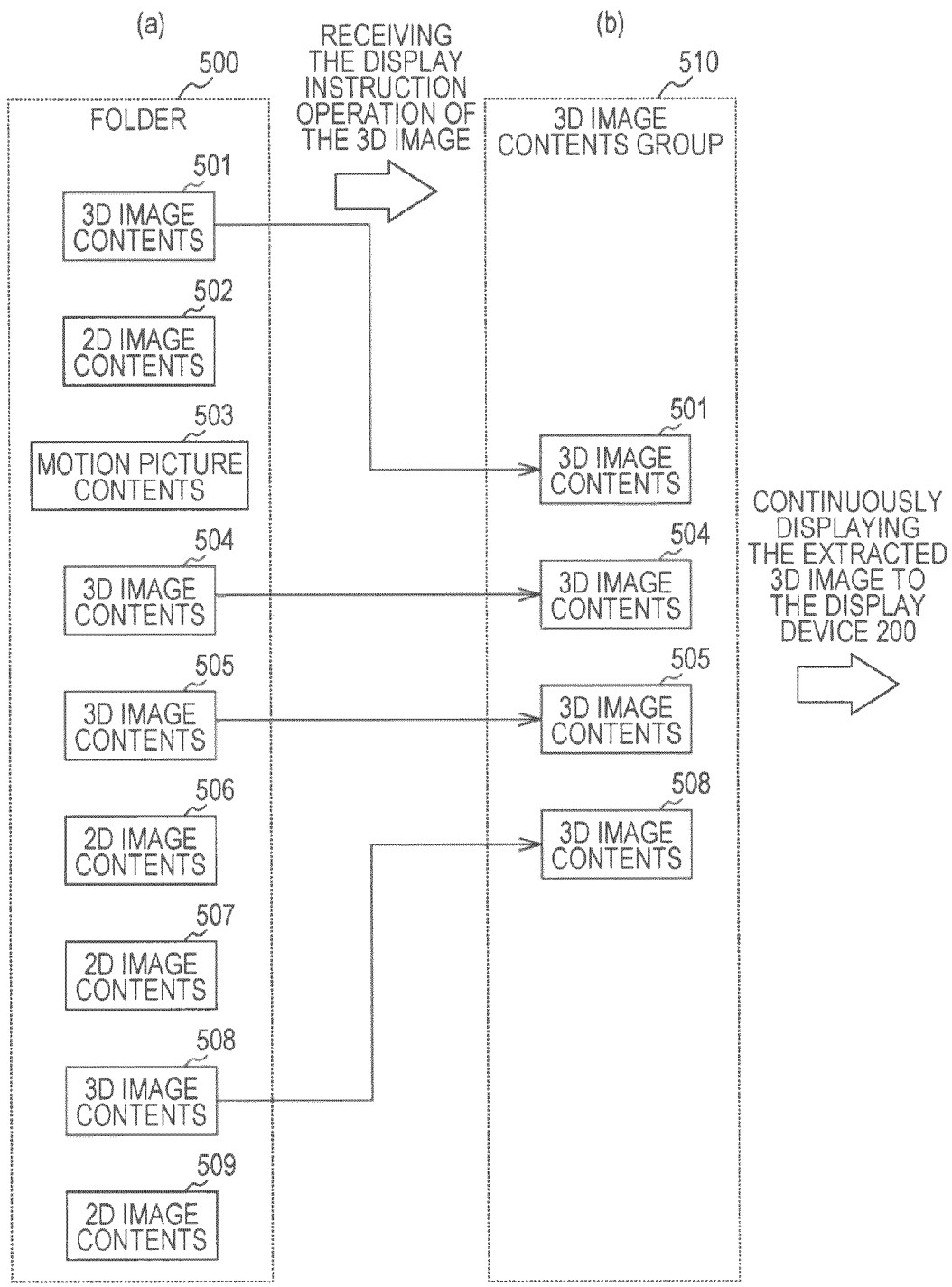
FIGS. 6A and 6B are diagrams that schematically show extraction processing of the stereoscopic image contents by a reproduction control portion in the first embodiment of the present invention.

Herein, the 3D image displayed after setting the 3D viewing mode will be described. As shown in FIG. 8A, in a case where the setting operation of the 3D viewing mode is performed when the 2D image based on the 3D image content is displayed on the display portion 180, after setting the 3D viewing mode, the 3D image is displayed on the display portion 220. For example, in a case where the setting operation of the 3D viewing mode is performed when the 2D image based on the 3D image content 501, 504, 505 and 508 shown in FIG. 6 is displayed on the display portion 180, after setting the 3D viewing mode, the 3D image is displayed on the display portion 220.

Furthermore, in a case where the setting operation of the 3D viewing mode is performed when the 2D image based on the image content other than the 3D image content is displayed on the display portion 180, after setting the 3D viewing mode, the 3D image situated near the display screen thereof is displayed on the display portion 220. In addition, the 3D image situated near the display screen (the 2D image displayed on the display portion 180 at the time of the setting operation of the 3D viewing mode) can be made, for example, as the lead 3D image content among the 3D image content situated after the display image in the reproduction sequence. For example, a case is supposed where the setting operation of the 3D viewing mode is performed when the 2D image based on the 2D image content 502 or the motion picture content 503 shown in FIGS. 6A and 6B is displayed on the display portion 180. In this case, after setting the 3D viewing mode, the 3D image based on the 3D image content 504 is displayed on the display portion 220. Similarly, for example, a case is supposed where the setting operation of the 3D viewing mode is performed when the 2D image based on the 2D image content 506 or 507 shown in FIGS. 6A and 6B is displayed on the display portion 180. In this case, after setting the 3D viewing mode, the 3D image based on the 3D image content 508 is displayed on the display portion 220.

In addition, after setting the 2D viewing mode, for example, the 3D image displayed on the display portion 220 at the time of the setting operation of the 2D viewing mode is displayed as the 2D image.

As mentioned above, immediately after the 3D viewing mode is set, the manual reproduction mode is set. For this reason, until the switch-over processing to the 3D viewing mode in the display device 200 is finished, a user can prevent an unintended image transmission of the 3D image from being performed. Furthermore, during setting of the 3D viewing mode, the switch-over operation from the manual reproduction mode to the automatic reproduction mode can be performed by user operation. The display examples are shown in FIGS. 8B and 8C. As a result, a user can enjoy a desired 3D image depending on preference.

FIG. 8C shows a display example (at the time of setting the automatic reproduction mode) in a case where the 3D image is displayed on the display portion 220 (the display device 200). In this manner, when the automatic reproduction mode is set, the operational support information 607 to 608 is displayed on the display portion 180 (the imaging device 100). In addition, the operational support information 607 is a character showing that the automatic reproduction mode is set. The operational support information 608 is a character showing the operation guide for supporting the instruction operation in the case of stopping the continuous reproduction when the continuous reproduction is performed. For example, the operational support information 608 shows that the continuous reproduction can be stopped by concurrently pushing down the decision button 133 and another operation member (e.g., an operation button 134). That is, when the display screen shown in FIG. 8C is displayed, by concurrently pushing down the decision button 133 and another operation button (e.g., the operation button 134), the switch-over operation from the automatic reproduction mode to the manual reproduction mode can be performed.

FIGS. 8A to 8C show examples in which, when the 2D image is displayed on the display portion 180, the 3D viewing mode is set according to the operational support information 601 displayed on the 2D image in an overlapped manner. Next, an example will be shown in which a menu screen is displayed on the display portion 180 by the display instruction operation of the menu screen and the 3D viewing mode is set according to the operational support information displayed on the menu screen.

FIGS. 9A to 9C are diagrams showing display examples of the display portion 180 (the imaging device 100) and the display portion 220 (the display device 200) in the first embodiment of the present invention. In addition, FIGS. 9B and 9C are identical to the display examples shown in FIGS. 8B and 8C, and thus the explanation thereof will be omitted.

FIG. 9A shows a display screen to be displayed on the display portion 180 after a menu button (not shown) is pushed down. In this manner, when the menu button (not shown) is pushed down, the menu screen is displayed on the display portion 180. FIG. 9A shows an example in which the 2D image of the 3D image content is set as a background image and menu items (the operational support information 611 to 613) are displayed on the background image in an overlapped manner.

The operational support information 611 has an operation button by which a push-down operation is performed in the case of performing the slide show. The operational support information 612 is an operation button by which a push-down operation is performed in the case of performing volume adjustment. The operational support information 613 is an operation button by which a push-down operation is performed in the case of setting the 3D viewing mode. That is, by setting the operational support information 613 in a selection state using the cross button 132 and pushing down the decision button 133, the setting operation of the 3D viewing mode can be performed. In this manner, when the 3D viewing mode is set, similarly to FIG. 8B, the display screen in the 3D viewing mode is displayed.

Herein, a case is also supposed where the equipment of the connection place connected via the inter-device interface is equipment incapable of displaying the 3D image. Furthermore, a case is also supposed where, when the setting operation of the 3D viewing mode is performed, the display device 200 is not connected to the imaging device 100. Herein, in a case where the equipment of the connection place is equipment incapable of displaying the 3D image, or in a case where the display device 200 is not connected to the imaging device 100, after the setting operation of the 3D viewing mode shown in FIGS. 8A and 9A is performed, the effect thereof can be displayed. The display example is shown in FIG. 10.

Figure 10:
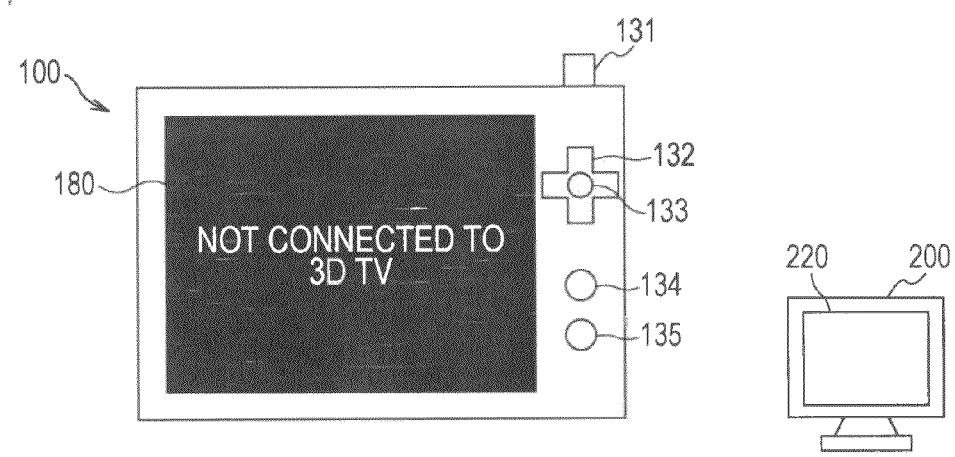
FIG. 10 is a diagram that shows a display example of a display portion (an imaging device) in the first embodiment of the present invention.

FIG. 10 is a diagram showing a display example of the display portion 180 (the display device 100) in the first embodiment of the present invention. This example shows a display example in which the display device 200 is not connected to the imaging device 100.

As shown in FIG. 10, in a case where the display device 200 is not connected to the imaging device 100, when the setting operations of the 3D viewing mode shown in FIGS. 8A and 9A are performed, for example, a message "not connected to a 3D TV" is displayed on the display portion 180. As a result, a user can rapidly grasp that the display device 200 is not connected to the imaging device 100.

Furthermore, when the 3D image content (3D image file) is copied or renamed or the like, a case is also supposed where the image content after the copying or the renaming hardly displays the stereoscopic image. In this manner, in regard to the 3D image content in which the stereoscopic image is hardly displayed due to copying, renaming or the like, when the reproduction instruction of the 3D image is performed by the user operation, it is possible to notify the warning to a user that the display of the stereoscopic image is not possible. For example, as the warning (a reproduction impossibility warning of the stereoscopic image), it is possible to display the message such as "3D images cannot be displayed" on the display portion 180.

Operation Example of Imaging Device

Figure 11:
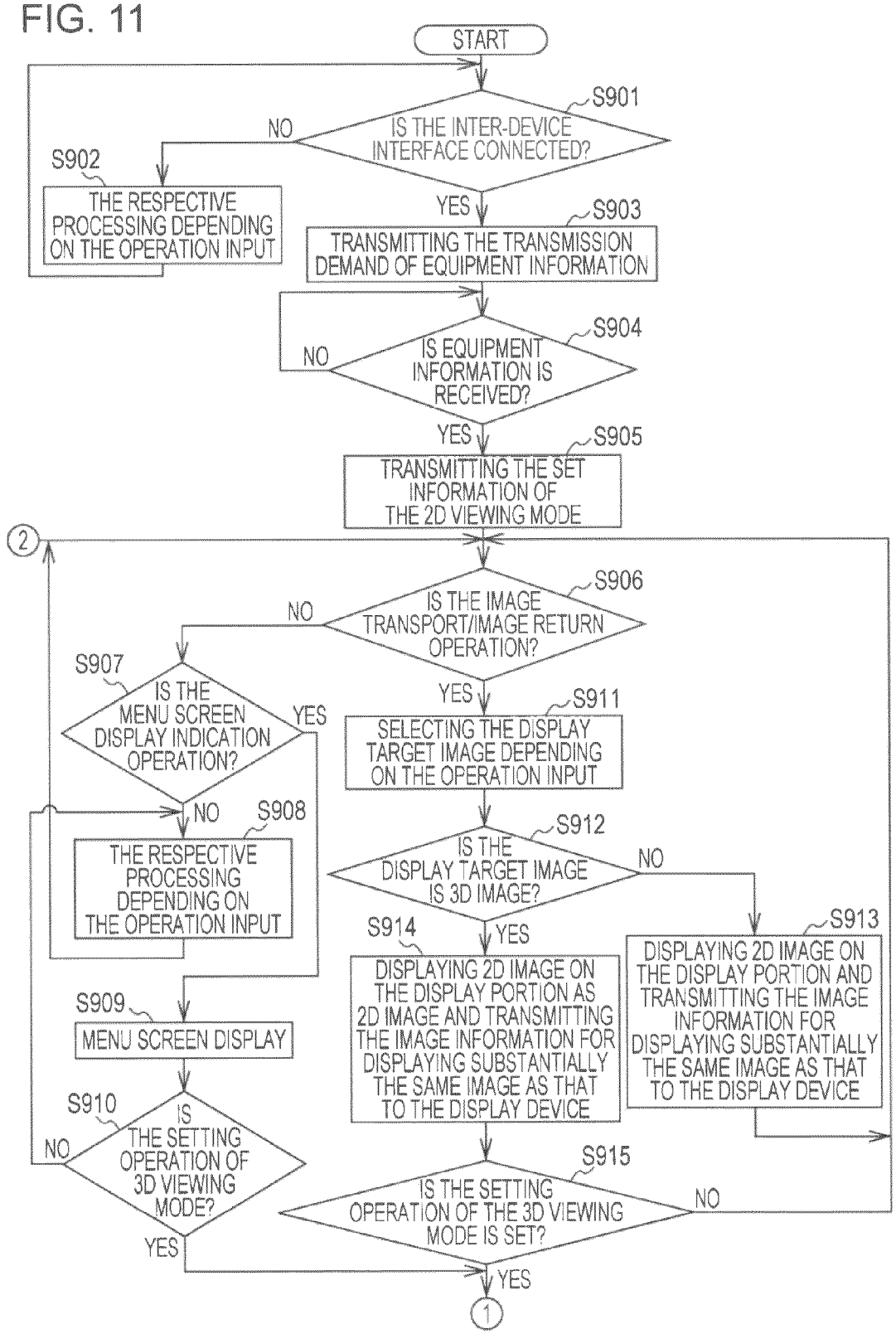
FIG. 11 is a flow chart that shows an example of a processing sequence of image content reproduction processing of an imaging device in the first embodiment of the present invention.
Figure 12:
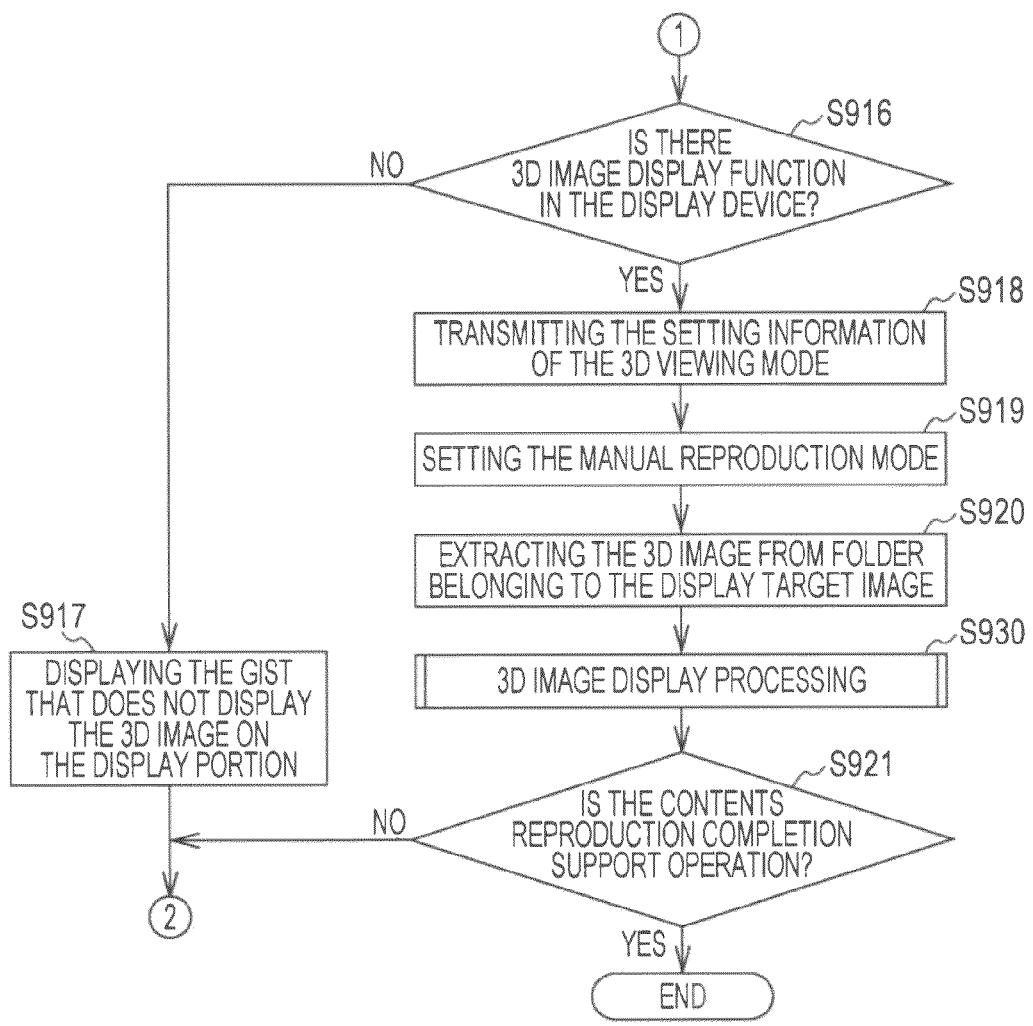
FIG. 12 is a flow chart that shows an example of a processing sequence of image content reproduction processing of an imaging device in the first embodiment of the present invention.

FIGS. 11 and 12 are flowcharts that show an example of a processing sequence of the image content reproduction processing by the imaging device 100 in the first embodiment of the present invention. In this example, a case will be explained as an example where the image content stored in the imaging device 100 is displayed on the display device 200 by the manual reproduction mode or the automatic reproduction mode. Furthermore, a case will be explained as an example where only the two dimensional image is displayed on the display portion 180 of the imaging device 100. In addition, the operation example of the display device 200 will be specifically explained with reference to FIGS. 14 and 15.

Firstly, when the operation input is received in which the power supply of the imaging device 100 is turned on by user operation, the imaging device 100 is activated. Furthermore, it is determined whether or not the inter-device interface 20 is connected (step S901). That is, it is determined whether or not the imaging device 100 is connected to the display device 200 via the inter-device interface 20.

When the inter-device interface 20 is not connected (step S901), various processing depending on the operation input from a user is performed (step S902). On the other hand, when the inter-device interface 20 is connected (when the imaging device 100 is connected to the display device 200 via the inter-device interface 20) (step S902), the equipment information transmission request is transmitted to the display device 200 (step S903). The equipment information is information concerning the display device of the connection place, and for example, whether or not the display function of the stereoscopic image is included, it is information including each method for displaying the stereoscopic image. As the respective methods, for example, information is included such as an SbS method (side by side method) that divides and transmits the respective point of view images for displaying the stereoscopic image left and right, or an OaU method which divides and transmits the respective point of view images for displaying the stereoscopic image up and down.

Next, it is determined whether or not the equipment information is received from the display device 200 (step S904), and when the information is received, the observation is continuously performed. On the other hand, when the equipment information is received from the display device 200 (step S904), the setting information of the 2D viewing mode is transmitted to the display device 200 (step S905). That is, the UI control portion 140 transmits the setting information of the 2D viewing mode to the display device 200 via the information input and output portion 190. As a result, the 2D viewing mode is set on the display device 200. Furthermore, a user wears the specialized glasses as the necessity arises.

Next, it is determined whether or not the image transmission operation or the image returning operation is performed (step S906). When the image transmission operation or the image returning operation is not performed (step S906), it is determined whether or not the display instruction operation of the menu screen is performed (step S907). In addition, step S906 is an example of the operation reception sequence described in the claims. When the display instruction operation of the menu screen is not performed (step S907), the respective processing depending on the operation input from a user is performed (step S908), and the process returns to step S906. On the other hand, when the display instruction operation of the menu screen is performed (step S907), the menu screen is displayed on the display portion 180 (step S909). For example, the display control portion 170 displays the menu screen on the display portion 180. Next, it is determined whether or not the setting operation of the 3D viewing mode is performed in the menu screen (step S910), when the setting operation of the 3D viewing mode is not performed, the process returns to step S908. On the other hand, when the setting operation of the 3D viewing mode is performed (step S910), the process progresses to step S916.

Furthermore, when the image transmission operation or the image returning operation is performed (step S906), the display target image is selected depending on the operation input (the image transmission operation or the image returning operation) (step S911). That is, the reproduction control portion 150 acquires and decodes the image content from the image content memory portion 300 depending on the operation input thereof, thereby developing the decoded image data to a predetermined area in the image memory 160.

Next, it is determined whether or not the display target image is a 3D image (step S912). That is, the UI control portion 140 determines whether or not the image is the 3D image based on the determination result of the image content by the reproduction control portion 150. When the display target image is not the 3D image (when the display target image is 2D image) (step S912), the 2D image is displayed on the display portion 180 (the imaging device 100) and the display portion 220 (the display device 200) (step S913). That is, the display control portion 170 displays the 2D image maintained in the image memory 160, on the display portion 180, thereby outputting the image information for displaying substantially the same image as this image to the display device 200 via the information input and output portion 190. In this case, the operation support information is displayed on the 2D image in an overlapped manner as the necessity arises.

Furthermore, when the display target image is the 3D image (step S912), the 3D image which is the display target is provided as the 2D image, the 2D image is displayed on the display portion 180 and the display portion 220 (step S914). That is, the display control portion 170 makes the 3D image maintained in the image memory 160 as the 2D image and displays the 2D image on the display portion 180, thereby outputting the image information for displaying the image approximately the same as the image to the display device 200 via the information input and output portion 190. In this case, the operational support information is displayed on the 2D image in an overlapped manner as the necessity arises. In addition, step S911 to S914 are examples of the first control sequence described in the claims. Next, it is determined whether or not the setting operation of the 3D viewing mode is performed (step S915), and when the setting operation of the 3D viewing mode is not performed, the process returns to step S906. In addition, step S915 is an example of the operation reception sequence described in the claims.

Furthermore, when the setting operation of the 3D viewing mode is set (step S910), it is determined whether or not the counterpart display device connected via the inter-device interface 20 includes the display function of the 3D image (step S916). For example, in step S904, based on the received equipment information, it is determined whether or not the counterpart display device includes the display function of the 3D image. Moreover, when the counterpart display device does not include the display function of the 3D image (step S916), the effect that the 3D image is hardly displayed on the connected counterpart display device is displayed on the display device 180 (step S917), and the process returns to step S906.

On the other hand, when the counterpart display device includes the display function of the 3D image (step S916), the setting information of the 3D viewing mode is transmitted to the display device 200 (step S918). That is, the UI control portion 140 transmits the setting information of the 3D viewing mode to the display device 200 via the information input and output portion 190. As a result, the switch-over processing of the 3D viewing mode is started in the display device 200.

Next, the manual reproduction mode is set in the imaging device 100 (step S919), and the 3D image content is extracted from the folder to which the display target image belongs (step S920). That is, the UI control portion 140 sets the manual reproduction mode and extracts the 3D image content from the folder to which the display target image belongs. In this case, for example, the whole 3D image content may be extracted from the image content memory portion 300. In addition, when the manual reproduction mode is set in the imaging device 100 when the setting operation of the 3D viewing mode is performed, the setting change of the reproduction mode is not performed. Moreover, step S920 is an example of the extraction sequence described in the claims.

Next, 3D image display processing is performed (step S930). The 3D image display processing is also explained with reference to FIG. 13. In addition, the step S930 is an example of a second control sequence described in claim 2.

Next, it is determined whether or not the content reproduction completion instruction operation is performed (step S921), when the content reproduction completion instruction operation is performed, the operation of the image content reproduction processing is finished. On the other hand, when the content reproduction completion instruction operation is not performed (step S921), the process returns to step S906.

Figure 13:
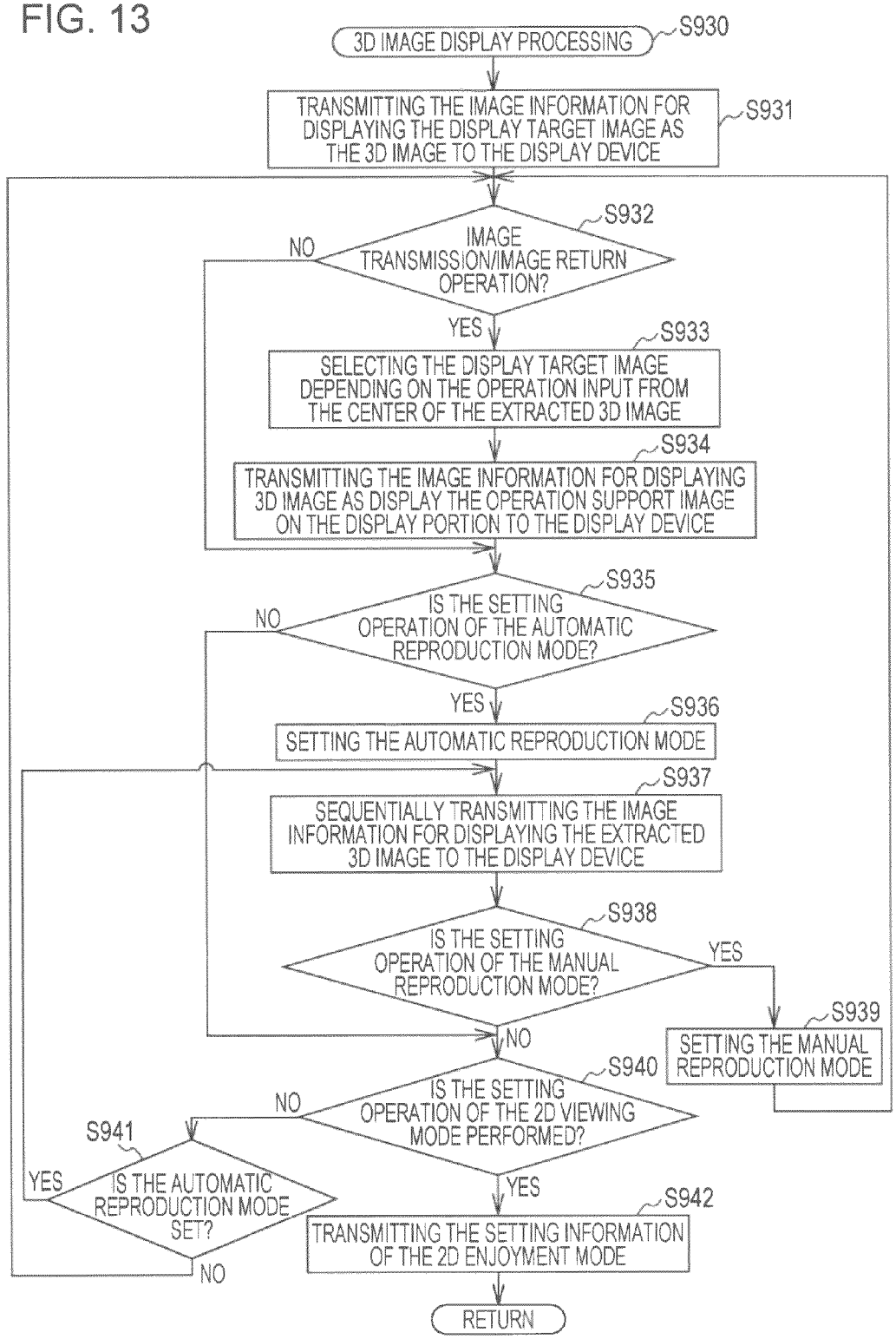
FIG. 13 is a flow chart that shows an example of 3D image display processing of a processing sequence of image content reproduction processing of an imaging device in the first embodiment of the present invention.

FIG. 13 is a flow chart that shows an example of the 3D image display processing (the processing sequence of step S930 shown in FIG. 12) among the processing sequences of the image content reproduction processing of the imaging device 100 in the first embodiment of the present invention.

Firstly, the 3D image which is the display target is displayed on the display portion 220 (step S931). That is, the display control portion 170 displays the operational support information on the display portion 180, and outputs the image information for displaying the 3D image maintained in the image memory 160 to the display device 200 via the information input and output portion 190.

Next, it is determined whether or not the image transmission operation or the image returning operation is performed (step S932), and when neither the image transmission operation nor the image returning operation are performed, the process progresses to step S935. On the other hand, when the image transmission operation or the image returning operation are performed (step S932), the display target image is selected from the 3D image extracted in step S920 depending on the operation input (the image transmission operation or the image returning operation) (step S933). That is, the reproduction control portion 150 acquires and decodes the image content from the extracted 3D image content depending on the operation input and develops the decoded image data to a predetermined area in the image memory 160.

Next, the operational support information is displayed on the display portion 180 (the imaging device 100) and the 3D image which is the display target is displayed on the display portion 220 (the display device 200) (step S934). That is, the display control portion 170 displays the operational support information on the display portion 180 and the 3D image maintained in the image memory 160 is displayed on the display device 200. In this case, the operational support information is not displayed but only the 3D image is displayed on the display device 200, and the 3D image is not displayed but only the operational support information is displayed on the display portion 180.

Next, it is determined whether or not the setting operation of the automatic reproduction mode is performed (step S935). When the setting operation of the automatic reproduction mode is not performed, the process progresses to step S940. On the other hand, when the setting operation of the automatic reproduction mode is performed (step S935), the automatic reproduction mode is set in the imaging device 100 (step S936), and the extracted 3D image is sequentially displayed on the display device 200 (step S937). That is, the UI control portion 140 sets the automatic reproduction mode and the reproduction control portion 150 decodes the extracted 3D image content and develops the decoded image data to a predetermined area in the image memory 160. Moreover, the display control portion 170 sequentially displays the 3D image maintained in the image memory 160 on the display device 200 for each fixed time.

Next, it is determined whether or not the setting operation of the manual reproduction mode is performed (step S938). When the setting operation of the automatic reproduction mode is performed (step S938), the manual reproduction mode is set in the imaging device 100 (step S939), and the process returns to step S932. On the other hand, when the setting operation of the automatic reproduction mode is not performed (step S938), it is determined whether or not the setting operation of the 2D viewing mode is performed (step S940). Moreover, when the setting operation of the 2D viewing mode is not performed (step S940), it is determined whether or not the automatic reproduction mode is set (step S941), and when the automatic reproduction mode is set, the progress returns to step S937. On the other hand, when the automatic reproduction mode is not set (namely, when the manual reproduction mode is set) (step S941), the process returns to step S932.

Furthermore, when the setting operation of the 2D viewing mode is performed (step S940), the setting information of the 2D viewing mode is transmitted to the display device 200 (step S942). In addition, when the setting operation of the 2D viewing mode is performed, in order to prevent the unintended image transmission by a user, the manual reproduction mode may be set in the imaging device 100.

Operation Example of Display Device

Figure 14:
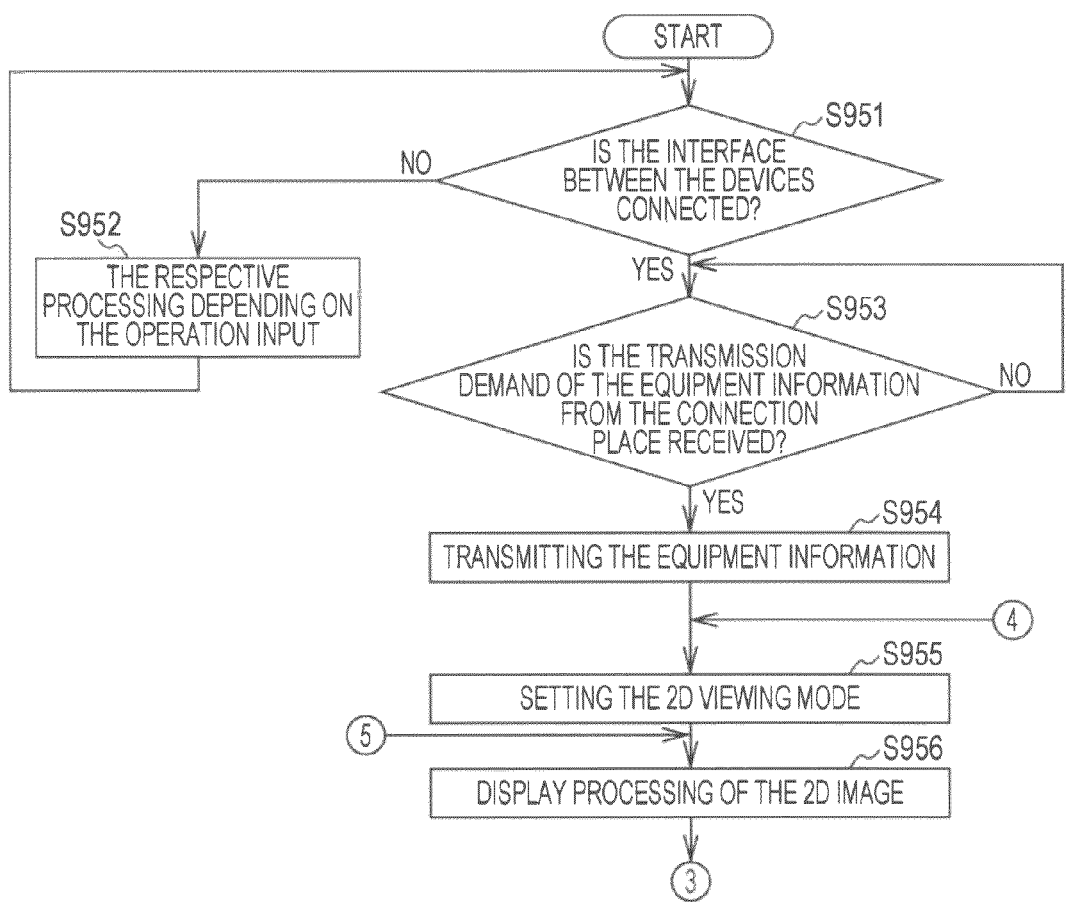
FIG. 14 is a flow chart that shows an example of a processing sequence of image content reproduction processing of an imaging device in the first embodiment of the present invention.
Figure 15:
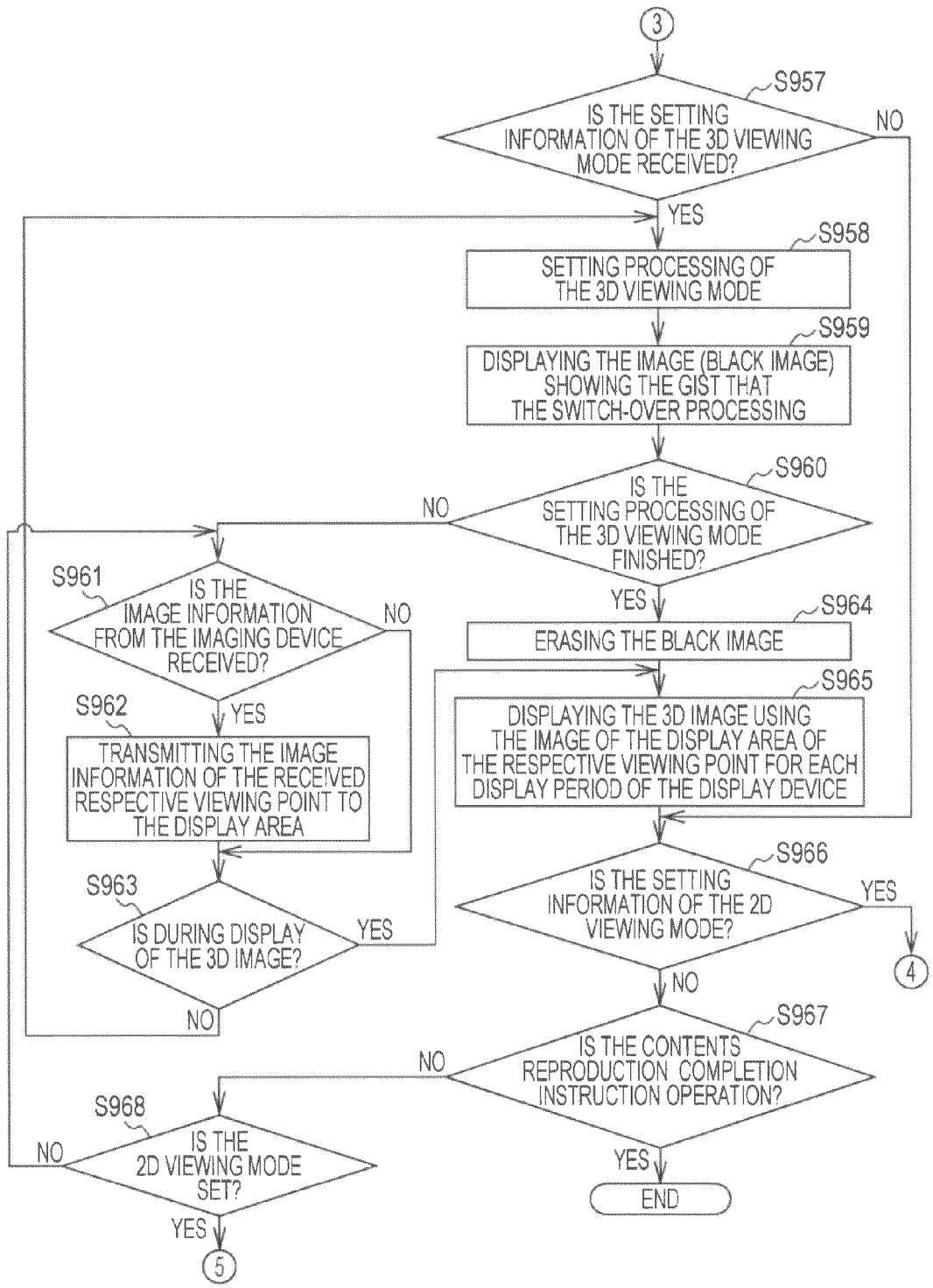
FIG. 15 is a flow chart that shows an example of a processing sequence of image content reproduction processing of an imaging device in the first embodiment of the present invention.

FIGS. 14 and 15 are flow charts that show an example of the processing sequence of the image content reproduction processing by the display device 200 in the first embodiment of the present invention. In the example, a case will be explained as an example where the image content stored in the imaging device 100 is displayed on the display device 200 by the manual reproduction mode or the automatic reproduction mode.

Firstly, when the operation input is received in which the power supply of the display device 200 is turned on by user operation, the display device 200 is activated. Next, it is determined whether or not the inter-device interface 20 is connected (step S951). That is, it is determined whether or not the display device 200 is connected to the imaging device 100 via the inter-device interface 20.

When the inter-device interface 20 is not connected (step S951), various processing depending on the operation input from a user is performed (step S952). On the other hand, when the inter-device interface 20 is connected (when the display device 200 is connected to the imaging device 100 via the inter-device interface 20) (step S951), it is determined whether or not the transmission request of the equipment information from the connection place (the imaging device 100) is received (step S953). Moreover, while until the transmission request of the equipment information from the connection place is received, the observation is continuously performed.

Furthermore, when the transmission request of the equipment information from the connection place is received (step S953), the equipment information is transmitted to the connection place (the imaging device 100) (step S954), and the 2D viewing mode is set (step S955). Moreover, the display processing of the 2D image is performed. That is, based on the image information transmitted from the imaging device 100, the 2D image is displayed on the display portion 220. A user wears the specialized glasses as the necessity arises.

Next, it is determined whether or not the setting information of the 3D viewing mode from the imaging device 100 is received (step S957), whereby, when the setting information of the 3D viewing mode is not received, the process progresses to step S966. On the other hand, when the setting information of the 3D viewing mode is received (step S957), the setting processing of the 3D viewing mode (the switch-over processing from the 2D viewing mode) is performed (step S958).

Next, the image (e.g., the black image) showing the effect, that is during setting processing of the 3D viewing mode, is displayed on the display portion 220 (step S959), and it is determined whether or not the setting processing of the 3D viewing mode is finished (step S960). When the setting processing of the 3D viewing mode is not finished (step S960), it is determined whether or not the image information (the 3D image) from the imaging device 100 is received (step S961), and when the image information from the imaging device 100 is not received, the process progresses to step S963. On the other hand, when the image information from the imaging device 100 is received (step S961), the respective point of view images included in the received image information (the 3D image) is transmitted to a predetermined display area (step S962). Moreover, it is determined whether or not the 3D image is being displayed on the display portion 220 (step S963). Herein, in the case of being under the switch-over processing, since the 3D image is not displayed on the display portion 220, it is determined not to be under the display of the 3D image (step S963), and the process returns to step S958. On the other hand, when the switch-over processing is finished and the 3D image is displayed on the display portion 220 (step S963), the process progresses to step S965.

Furthermore, when the setting processing of the 3D viewing mode is finished (step S960), the image (e.g., the black image) showing under the switch-over processing is erased from the display portion 220 (step S964). Next, the respective point of view images transmitted to a predetermined display area in regard to the image information (the 3D image) received from the imaging device 100 are displayed on the display portion 220 as the 3D image for each display period of the display device 200 (step S965).

Next, it is determined whether or not the setting information of the 2D viewing mode from the imaging device 100 is received (step S966), whereby, when the setting information of the 2D viewing mode is received, the process returns to step S955. On the other hand, when the setting information of the 2D viewing mode is not received (step S966), it is determined whether or not the content reproduction completion instruction operation is performed (step S967). When the content reproduction completion instruction operation is performed, the operation of the image content reproduction processing is completed. On the other hand, when the content reproduction completion instruction operation is not performed (step S967), it is determined whether or not the 2D viewing mode is set (step S968). When the 2D viewing mode is set, the process returns to step S956. Moreover, when the 2D viewing mode is not set (that is, when the 3D viewing mode is set) (step S968), the process returns to step S961.

As described above, according to the first embodiment of the present invention, when the 3D viewing mode is set, only the stereoscopic image content is extracted from the image content memory portion 300, and only the extracted stereoscopic image is continuously displayed. As a result, when the 2D image and the 3D image are mixed with each other and are housed in the same folder, even when the image transmission and image returning operation or the continuous reproduction processing is performed, only the 3D image belonging to the folder can be continuously displayed. In this case, while the setting operation of the 2D viewing mode is performed by a user, since the switch-over processing of the viewing mode is not performed in the display device 200, the display of the 3D image in the display device 200 is not interrupted. For this reason, the user can continuously enjoy the powerful 3D image without waiting, which can make the 3D image easy to view. Moreover, it is possible to reduce the complication of the system due to the switch-over processing of the 2D viewing mode and the 3D viewing mode.

Furthermore, since the manual reproduction mode is set in the imaging device 100 at the time of the setting of the 3D viewing mode, at the time of the switch-over processing in the display device 200, it is possible to prevent an unintended image transmission by a user from being performed. As a result, after the setting of the 3D viewing mode, a desired 3D image of a user can be rapidly viewed, which can make the 3D image easy to see.

2. Modified Example

In the above, an example was shown in which the setting operation or the like of the 3D viewing mode is performed using the operation buttons (131 to 135) included in the imaging device 100. In the present modified example, an example is shown in which the display portion 180 is constituted by a touch panel and the setting operation or the like of the 3D viewing mode is performed using the touch panel. In addition, the configurations or the like of the imaging device 100 and the display device 200 are identical to the first embodiment of the present invention except that the display portion 180 is constituted by the touch panel. For that reason, the points of difference from the first embodiment of the present invention will mainly be explained and a part of the explanation of the common portions will be omitted.

Display Example of Plane Image in Imaging Device and Display Device

Figure 16A:
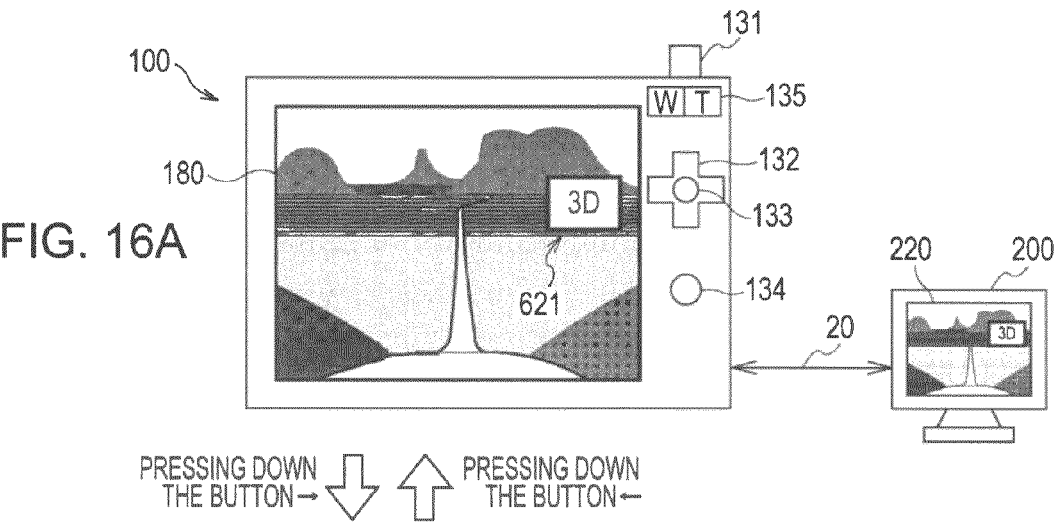
FIGS. 16A to 16C are diagrams that show display examples of a display portion 180 (an imaging device) and a display portion 220 (a display device) in a modified example of the first embodiment of the present invention.
Figure 16B:
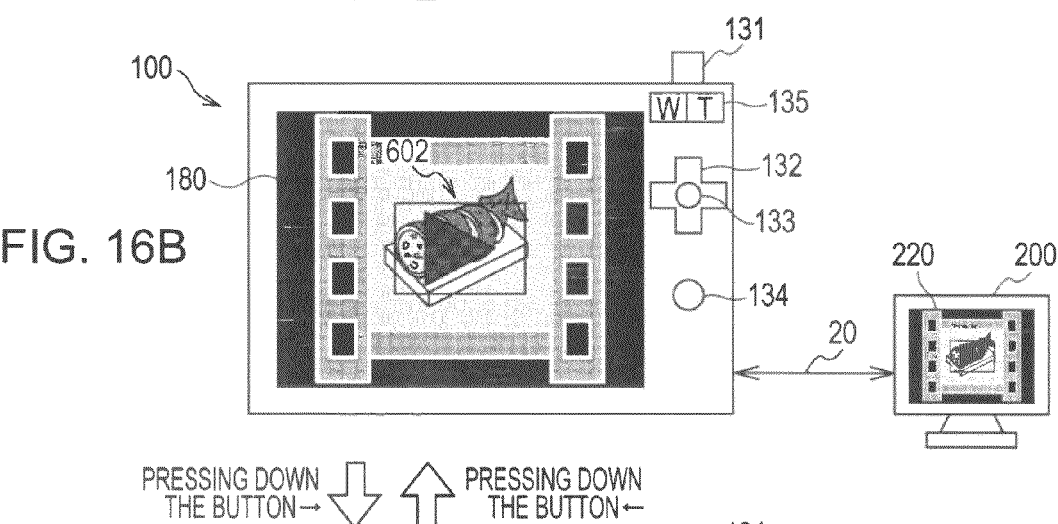
Figure 16C:
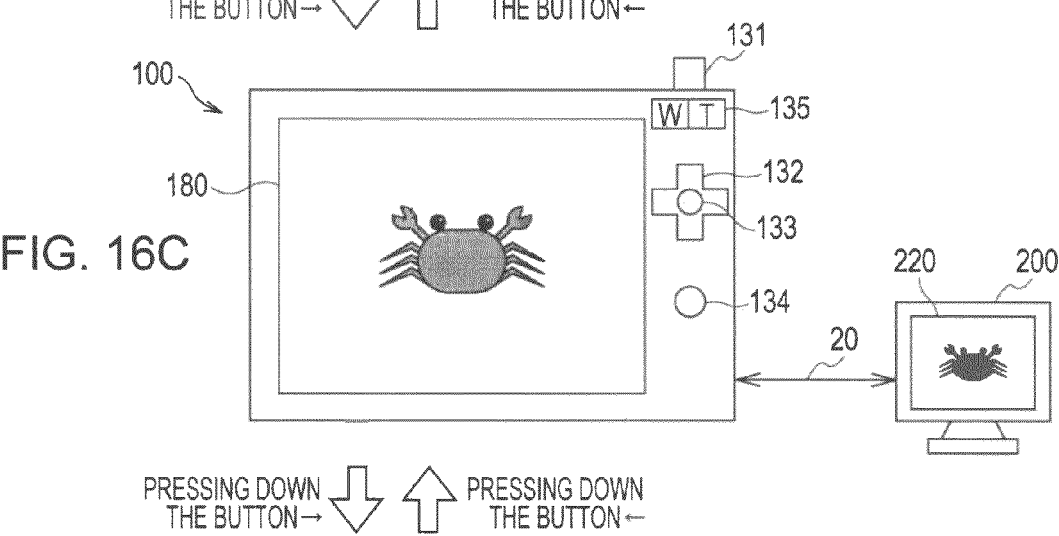

FIGS. 16A to 16C are diagrams that show the display examples of the display portion 180 (the imaging device 100) and the display portion 220 (the display device 200) in a modified example of the first embodiment of the present invention. In addition, FIGS. 16B and 16C are identical to the display examples shown in FIGS. 7B and 7C, and thus the explanation thereof will be omitted.

FIG. 16A shows a display example in a case where the 3D image content (a background color including a direct road extending to the wilderness) is displayed as the 2D image. Furthermore, as shown in FIG. 16A, on the display portion 180 (the imaging device 100) and the display portion 220 (the display device 200), the operational support information 621 is displayed on the 2D image in an overlapped manner. The operational support information 621 shows the operation guide for supporting the instruction operation for displaying the 3D image on the display device 200 when the image which is the display target is a 3D image. Specifically, a user performs the touch operation contacting a rectangular area corresponding to the operational support information 621, whereby the 3D viewing mode can be set.

In addition, in the display example shown in FIG. 16A, as the operational support information, the case of displaying the operational support information 621 is shown, but other operational support information (e.g., the operational support information for performing the image transmission or the imager returning) may be displayed. In addition, since the operational support information 621 is displayed on the 2D image in an overlapped manner, it is desirable to display the operational support information 621 at the end portion (e.g., a left end portion or a right end portion of the 2D image) of the 2D image so that the 2D image is easily viewed.

Display Transition Example in Imaging Device and Display Device

FIGS. 17A to 17C are drawings that show display examples of the display portion 180 (the imaging device 100) and the display portion 220 (the display device 200) in the first embodiment of the present invention. In addition, FIG. 17A is identical to the display example shown in FIG. 16A, and thus the explanation thereof will be omitted. In addition, FIGS. 17B and 17C are approximately identical to the display examples shown in FIGS. 8B and 8C except that the operational support information 641 to 644 differ. For that reason, a part of the explanation of the portion common to FIGS. 8B and 8C will be omitted.

In a case where the display screen shown in FIG. 17A is displayed, when the setting operation which sets the 3D viewing mode is performed, a user pushes down the rectangular area corresponding to the operational support information 621. When the push-down operation is performed, the UI control portion 140 transmits the setting information instructing the setting of the 3D viewing mode to the display device 200 and sets the manual reproduction mode in the imaging device 100. Furthermore, as shown in FIGS. 8A to 8C, the 3D image content is extracted from the image content memory portion 300. Furthermore, after the switch-over processing to the 3D viewing mode is finished, the display device 200 displays the 3D image based on the image information received from the imaging device 100. The display example is shown in FIG. 17B.

FIG. 17B shows a display example (at the time of setting the manual reproduction mode) in a case where the 3D image is displayed on the display portion 220 (the display device 200). In this manner, when the 3D image is displayed on the display portion 220, the 3D image is not displayed but the operational support information 641 to 644 is displayed on the display portion 180 (the imaging device 100). In addition, the operational support information 641 is a sign that shows the operation guide for supporting the instruction operation (the setting operation of the automatic reproduction mode) which starts the continuous reproduction of the 3D image becoming the display target. For example, the automatic reproduction mode can be set by pushing down the rectangular area corresponding to the operational support information 641. Furthermore, the operational support information 642 is a sign that shows the operation guide for supporting the instruction operation (the setting operation of the 2D viewing mode) which releases the 3D viewing mode and sets the 2D viewing mode. For example, the 2D viewing mode can be set by pushing down the rectangular area corresponding to the operational support information 642. Furthermore, the operational support information 643 and 644 is a sign that show the operation guide for supporting the image transmission operation or the image returning operation of the 3D image which is the display target.

Furthermore, during setting of the 3D viewing mode, the switch-over operation from the manual reproduction mode to the automatic reproduction mode can be performed by the user operation. The display examples are shown in FIGS. 17B and 17C. As a result, a user can enjoy a desired 3D image depending on preference.

FIG. 17C shows a display example (at the time of setting the automatic reproduction mode) in a case where the 3D image is displayed on the display portion 220 (the display device 200). In this manner, when the automatic reproduction mode is set, the operational support information 645 is displayed on the display portion 180 (the imaging device 100). In addition, the operational support information 645 is a character showing that the automatic reproduction mode is set.

Furthermore, when the display screen shown in FIG. 17C is displayed, a user performs the touch operation contacting any part of the display screen in the display portion 180, whereby the switch-over operation from the automatic reproduction mode to the manual reproduction mode can be performed.

FIGS. 17A to 17C show examples in which, when the 2D image is displayed on the display portion 180, by pushing down the rectangular area corresponding to the operational support information 621 displayed on the 2D image in an overlapped manner, the 3D viewing mode is set. In the following example, an example will be shown in which a menu screen is displayed on the display portion 180 by the display instruction operation of the menu screen and the 3D viewing mode is set according to the operational support information displayed on the menu screen.

FIGS. 18A to 18C are diagrams showing display examples of the display portion 180 (the imaging device 100) and the display portion 220 (the display device 200) in the first embodiment of the present invention. In addition, FIGS. 18B and 18C are identical to the display examples shown in FIGS. 17B and 17C, and thus the explanation thereof will be omitted. Furthermore, FIG. 18A is identical to the display example shown in FIG. 9A except that the operational support information 631 to 636 differ. For this reason, a part of the explanation of the portion common to FIG. 9A will be omitted.

FIG. 18A shows a display screen to be displayed on the display portion 180 after a menu button (not shown) is pushed down. In this manner, when the menu button (not shown) is pushed down, the menu screen is displayed on the display portion 180. FIG. 18A shows an example in which the 2D image of the 3D image content is set as a background image and menu items (the operational support information 631 to 636) are displayed on the background image in an overlapped manner. In addition, the operational support information 631 to 633 correspond to the operational support information 611 to 613 shown in FIG. 9A, and thus the explanation thereof will be omitted.

The operational support information 641 is an operation button in which the push-down operation is performed when the respective operations are performed according to DPOF (Digital Print Order Format). Furthermore, the operational support information 642 is an operation button in which the push-down operation is performed when a list of the image content stored in the image content memory portion 300 is displayed. Furthermore, the operational support information 643 is an operation button in which the push-down operation is performed when the image displayed on the display portion 180 is printed.

Herein, the setting operation in the case of setting the 3D viewing mode will be explained. A user performs the touch operation contacting the rectangular area corresponding to the operational support information 633, whereby the setting operation of the 3D viewing mode can be performed. In this manner, when the 3D viewing mode is set, similarly to FIGS. 17B and 17C, the display screen in the 3D viewing mode is displayed.

Examples were shown in which the respective settings are performed using the operation member in the imaging device 100, but, for example, various settings may be performed by the input operation such as a remote (a remote control). For example, as the inter-device interface, the imaging device 100 and the display device 200 can be connected to each other using a cable of a HDMI-CEC (Consumer Electronics Control) standard. In this case, it is possible to perform various settings by the remote operation from the display device 200. For example, it is possible to perform various operations by transmitting the remote signal of the display device 200 to the imaging device 100 via the cable.

In addition, in the embodiments of the present invention, the imaging device is explained as an example, but, the embodiments of the present invention can be applied to an image processing device in which the stereoscopic image content stored in the recording medium can be displayed on an external display device. For example, the embodiments of the present invention can be applied to an image processing device such as a mobile phone having the imaging function, a navigation system, and a portable media player.

In addition, the embodiments of the present invention show an example for embodying the present invention, and, as specified in the embodiments of the present invention, has the correspondence relationship with each of the items in the embodiments of the present embodiment and each of the specific items of the invention in the claims. In a similar manner, the embodiments of the invention have the correspondence relationship with each of the specific items of the invention in the claims and each of the items in the embodiments of the present invention with the same name. However, the present invention is not limited to the embodiments, and can be embodied by variously modifying the embodiments within the scope without departing from the gist of the present invention.

Moreover, the processing sequence explained in the embodiments of the present invention may be grasped as the method having a series of sequences and may be grasped as a program for executing the series of sequences in a computer and a recording medium that stores the program. The recording medium, for example, a CD (Compact Disc), a MD (Mini-Disc), a DVD (Digital Versatile Disc), a memory card, a Blu-ray Disc (trade mark) or the like can be used.

The present application contains subject matter related to that disclosed in Japanese Priority Patent Application JP 2010-046016 filed in the Japan Patent Office on Mar. 3, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
an operation reception portion implemented by circuitry and configured to receive an instruction operation for displaying a desired image from a plane image or a stereoscopic image that is stored in a recording medium;
an information output portion implemented by the circuitry, connected to a display device that is external to the image processing device, and configured to display the plane image or the stereoscopic image and to output image information for displaying the image stored in the recording medium on the display device; and
a control portion implemented by the circuitry and configured to perform
a control in which the image stored in the recording medium is displayed on the display device based on the received instruction operation,
a control in which, when the instruction operation to display the plane image as the instruction operation is received, the plane image is displayed on a display of the image processing device and on the display device that is external to the image processing device, and
a control in which, when the instruction operation to display the stereoscopic image as the instruction operation is received,
the stereoscopic image from the image stored in the recording medium is extracted,
the extracted stereoscopic image is continuously displayed on the display device that is external to the image processing device, without being displayed on the display of the image processing device, and
operational information is displayed on the display of the image processing device, while the extracted stereoscopic image is continuously displayed on the display device that is external to the image processing device.

2. The image processing device according to claim 1, further comprising:
a setting portion implemented by the circuitry and configured to set a first mode which sequentially displays the image stored in the recording medium on the display device by a manual operation of a user, and a second mode which automatically and sequentially displays the image stored in the recording medium on the display device, as an operation mode for performing the display operation of the image to be displayed on the display device,
wherein, when the instruction operation to display the stereoscopic image is received, and when the second mode is set, the control portion is configured to set the first mode.

3. The image processing device according to claim 1, wherein the control portion is configured to perform the control in which, when the instruction operation to display the stereoscopic image is received, the stereoscopic image allocated to a folder, to which the image displayed on the display device belongs, is extracted from the recording medium.

4. The image processing device according to claim 1, wherein the control portion is configured to perform the control, in which, when the instruction operation to display the stereoscopic image is received, and when the plane image is displayed on the display device, the extracted stereoscopic image is displayed on the display device instead of the plane image.

5. The image processing device according to claim 1, wherein, when the instruction operation to display the stereoscopic image is received, the control portion is configured to perform the extraction of the stereoscopic image on the condition that the information output portion is connected to the display device.

6. The image processing device according to claim 1, wherein the operation reception portion is configured to receive a setting operation, which sets either stereoscopic image display mode for displaying the stereoscopic image on the display device and a plane image display mode for displaying the plane image on the display device, as the instruction operation, and
wherein the control portion is configured to perform the control in which, when the instruction operation setting the stereoscopic image display mode is received, the extraction of the stereoscopic image is performed and the extracted stereoscopic image is continuously displayed on the display device.

7. The image processing device according to claim 6, wherein the control portion is configured to perform the control in which, when the plane image display mode is set, in regard to the plane image stored in the recording medium, the plane image is displayed on the display device, and in regard to the stereoscopic image stored in the recording medium, the stereoscopic image is set as the plane image and the plane image is displayed on the display device.

8. The image processing device according to claim 1, wherein the information output portion is connected to the display device that is external to the image processing device via a High-Definition Multimedia Interface (HDMI).

9. The image processing device according to claim 1, wherein the image processing device is a camera and the display device is a television.

10. The image processing device according to claim 1, wherein both the plane image and the stereoscopic image are stored in a same folder in the recording medium.

11. The image processing device according to claim 10, wherein the folder includes all images captured at a same date and time.

12. The image processing device according to claim 11, wherein
the control portion is configured to perform a control in which, when an automatic stereoscopic reproduction mode is set, all stereoscopic images stored in the folder are extracted from among the total images in the folder, including both planar images and stereoscopic images, and the extracted stereoscopic images are sequentially displayed on the display device that is external to the image processing device.

13. An image processing method performed by an image processing device that includes a processor, the method comprising steps of:
receiving an instruction operation to display a desired image from a plane image or a stereoscopic image stored in a recording medium on a display device that is external to the image processing device and that is connected via an information output portion;
performing a first control in which an image stored in the recording medium is displayed on the display device based on the instruction operation when the instruction operation is received;
performing a second control in which, when the instruction operation to display the plane image as the instruction operation is received, the plane image is displayed on a display of the image processing device and on the display device that is external to the image processing device;

extracting the stereoscopic image from the image stored in the recoding medium when an instruction operation to display the stereoscopic image as the instruction operation is received; and performing, by the processor of the image processing device, a third control in which the extracted stereoscopic image is continuously displayed on the display device that is external to the image processing device, without being displayed on the display of the image processing device, and in which operational information is displayed on the display of the image processing device, while the extracted stereoscopic image is continuously displayed on the display device that is external to the image processing device.

14. A non-transitory computer-readable storage medium including computer executable instructions, wherein the instructions, when executed by an image processing device implemented as a computer, cause the image processing device to perform a method, the method comprising:

receiving an instruction operation to display a desired image from a plane image or a stereoscopic image stored in a recording medium on a display device that is external to the image processing device and that is connected via an information output portion;

performing a first control in which an image stored in the recording medium is displayed on the display device based on the instruction operation when the instruction operation is received;

performing a second control in which, when the instruction operation to display the plane image as the instruction operation is received, the plane image is displayed on a display of the image processing device and on the display device that is external to the image processing device;

extracting the stereoscopic image from within the image stored in the recoding medium when an instruction operation to display the stereoscopic image as the instruction operation is received; and performing a third control in which the extracted stereoscopic image is continuously displayed on the display device that is external to the image processing device, without being displayed on the display of the image processing device, and in which operational information is displayed on the display of the image processing device, while the extracted stereoscopic image is continuously displayed on the display device that is external to the image processing device.

* * * * *